Aug. 14, 1956

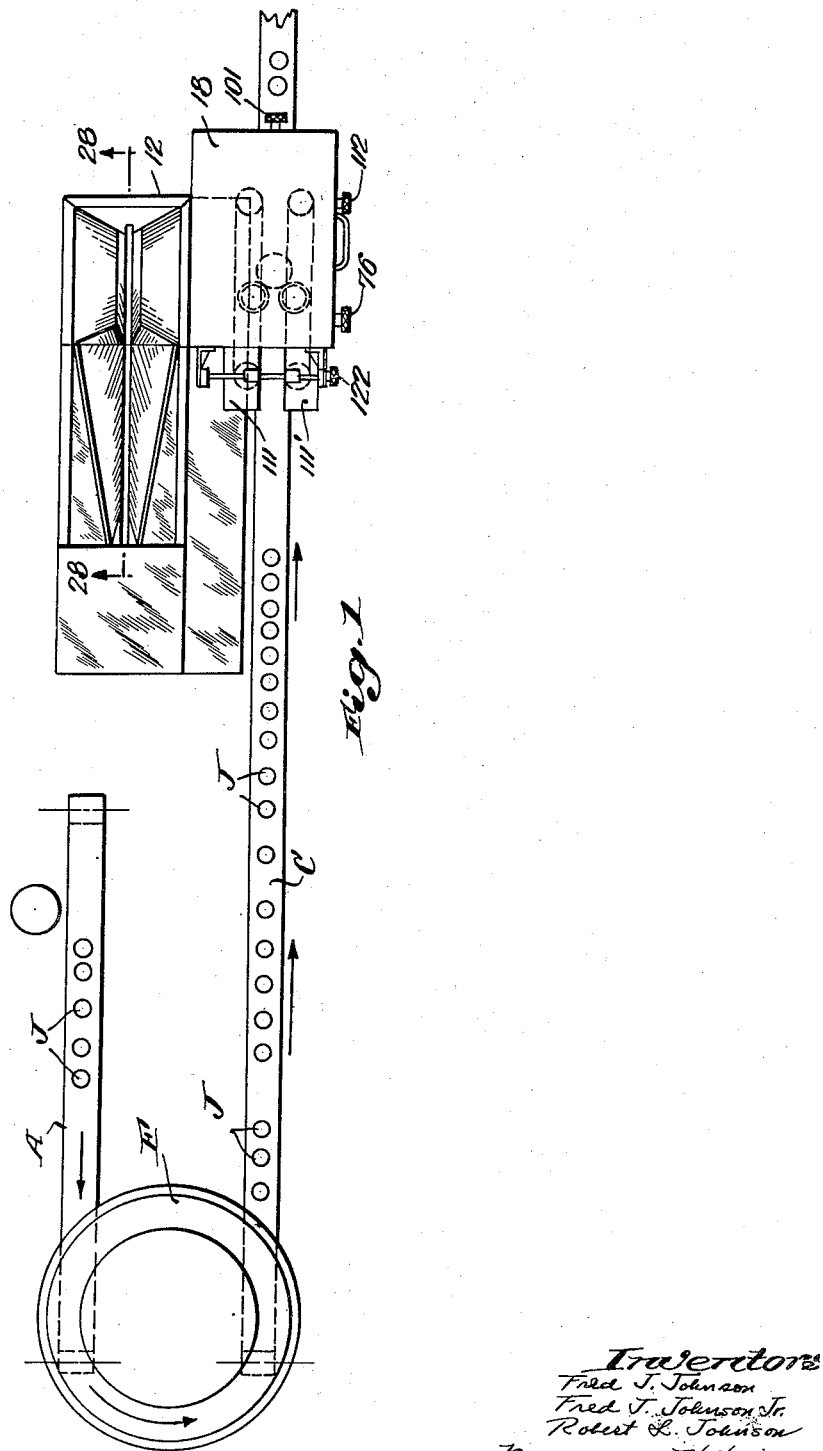

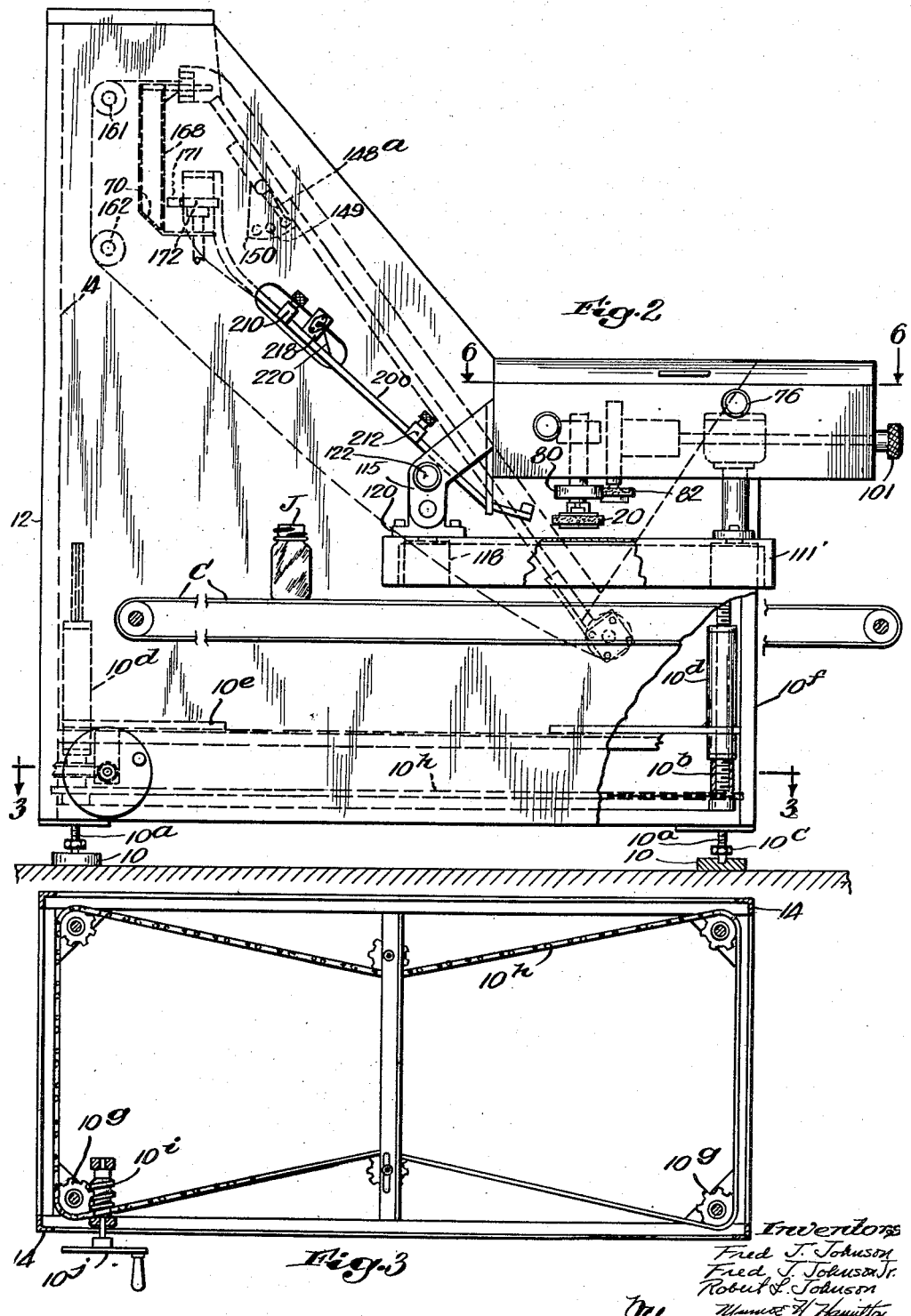

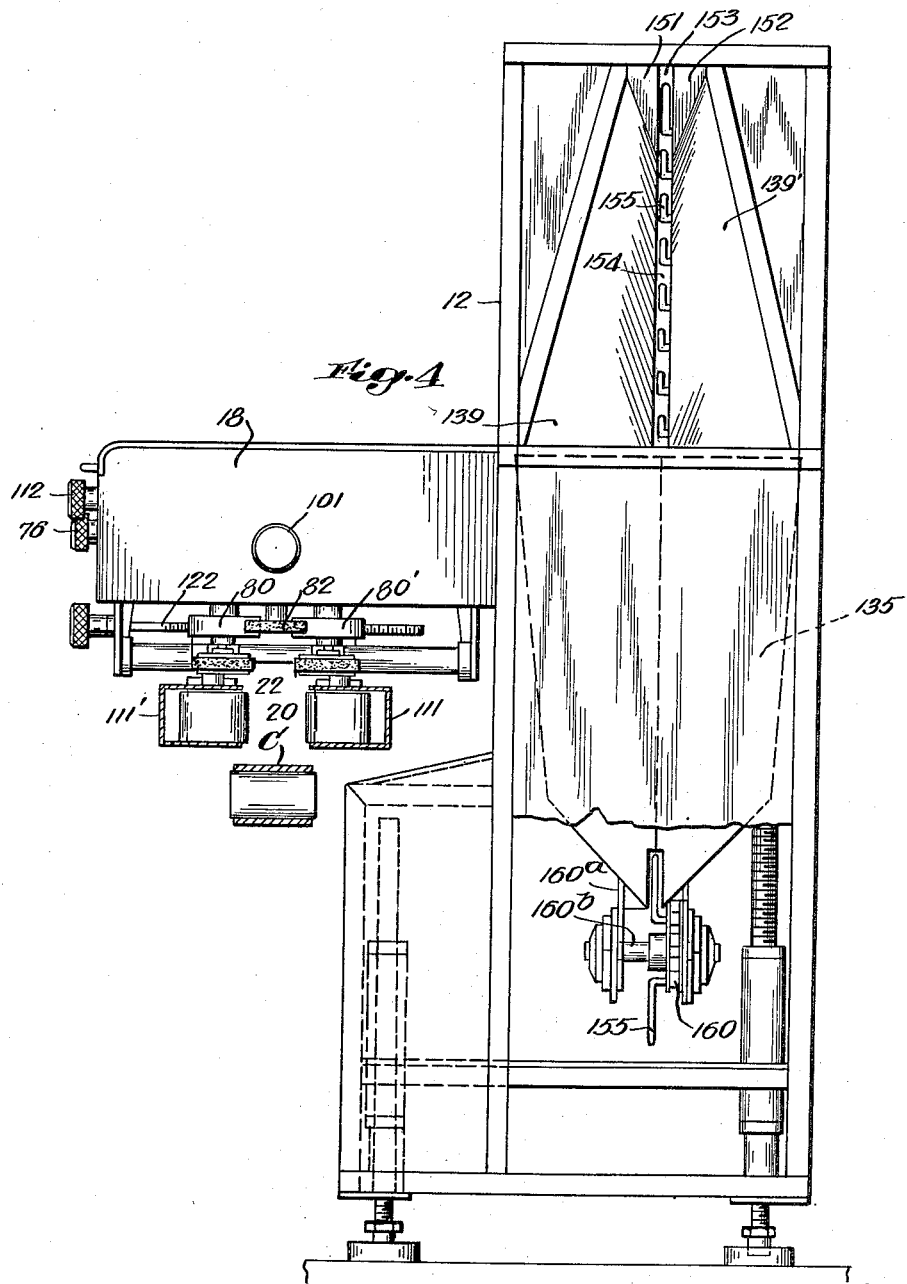

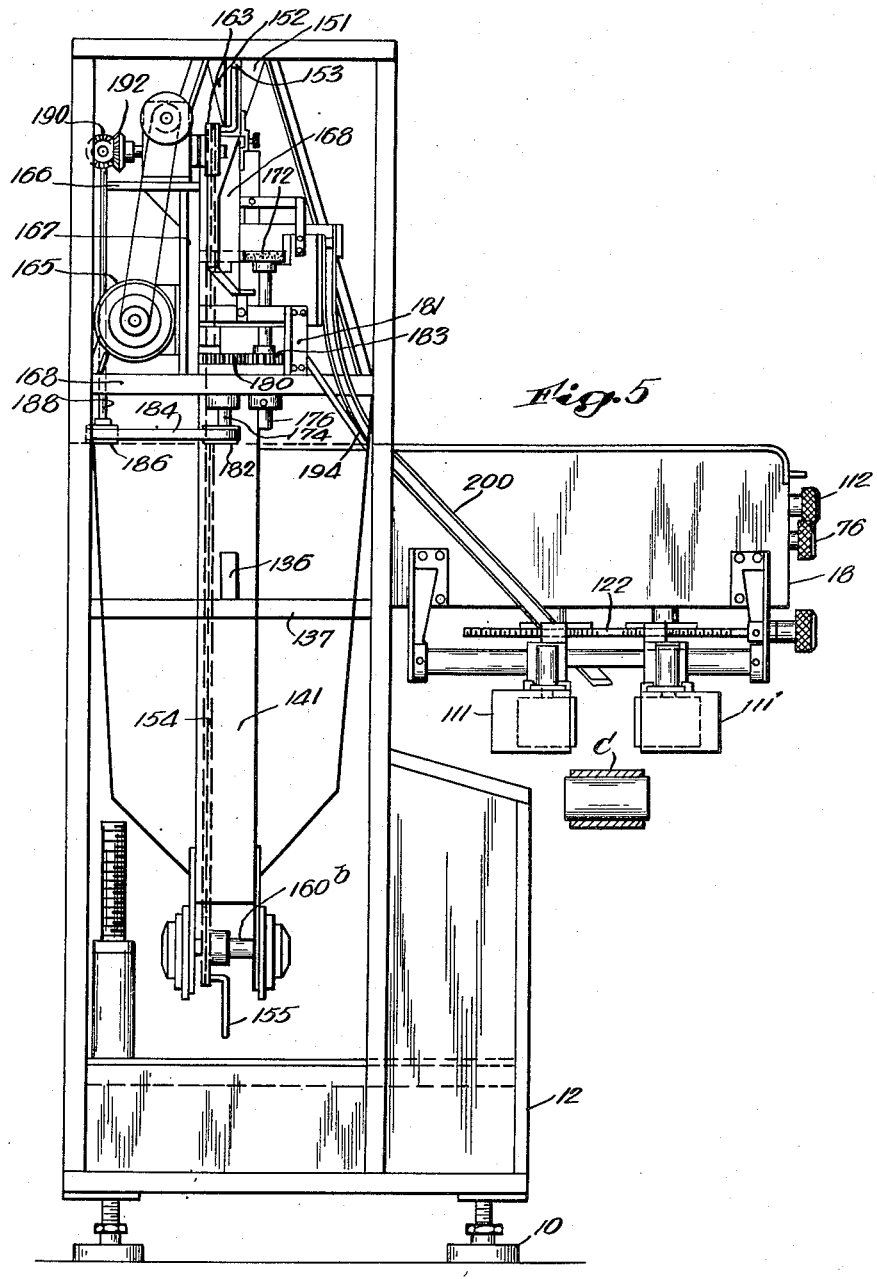

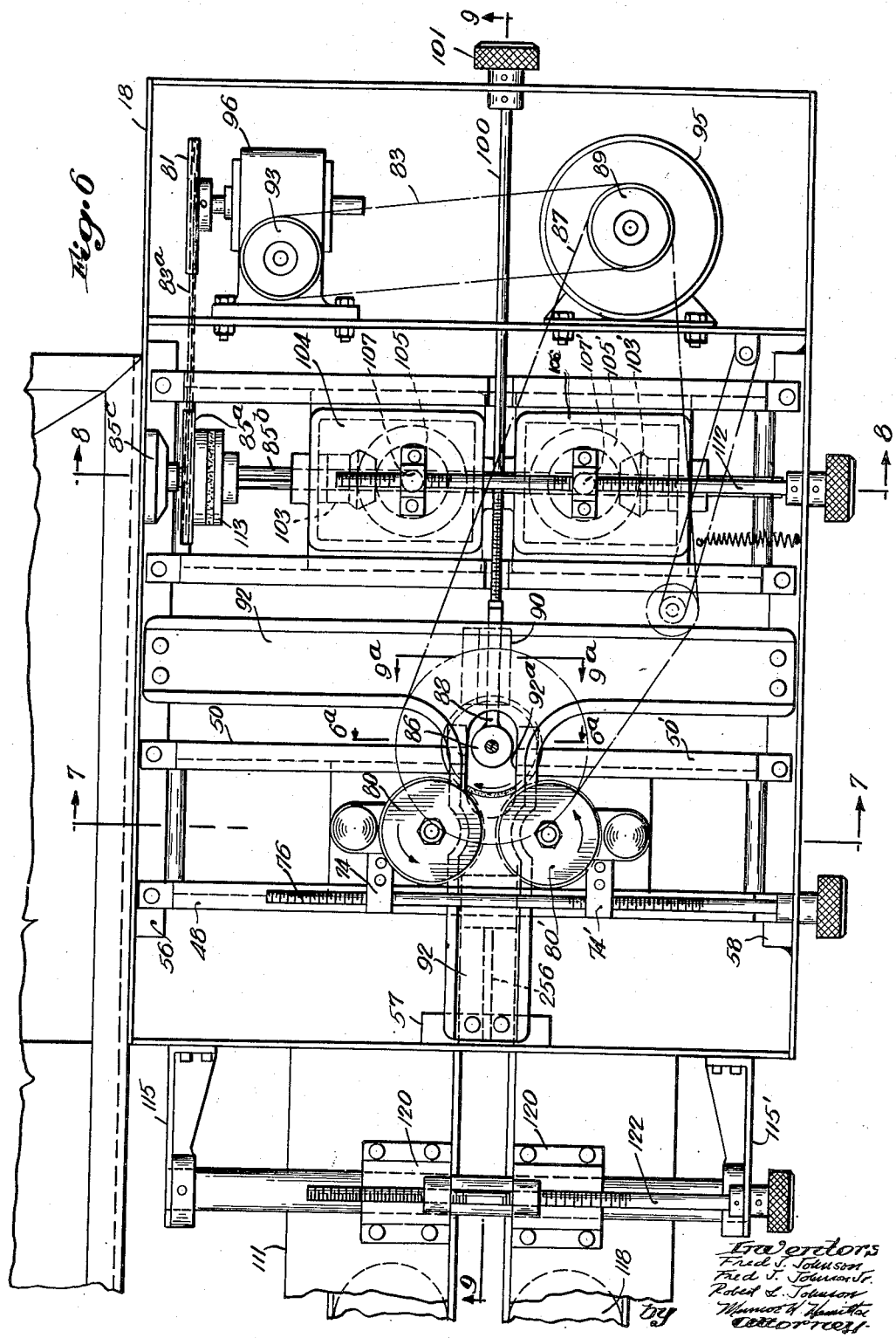

F. J. JOHNSON ET AL 2,758,434

MACHINE FOR FEEDING AND APPLYING
SCREW THREADED CAPS TO JARS

Filed Aug. 10, 1951

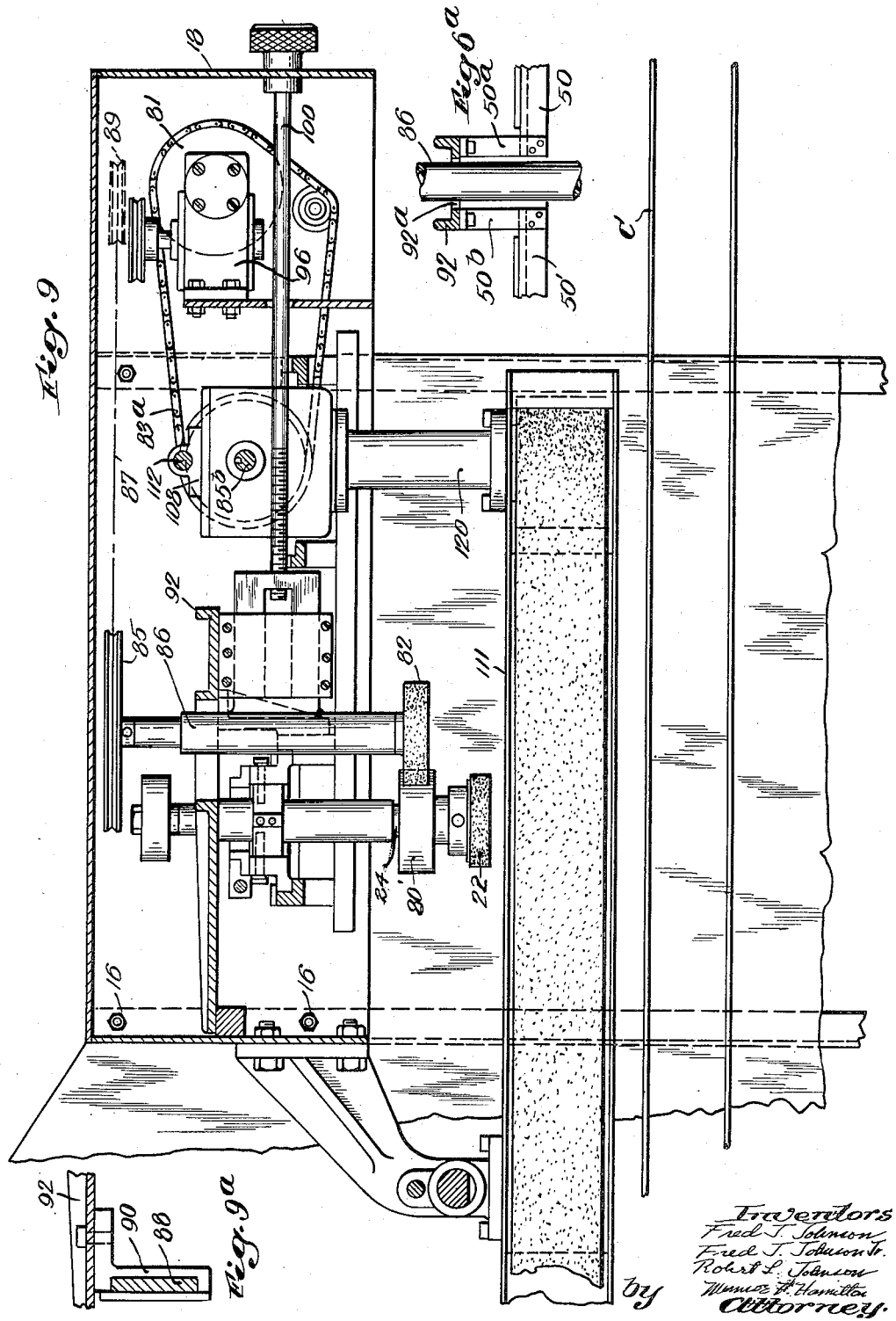

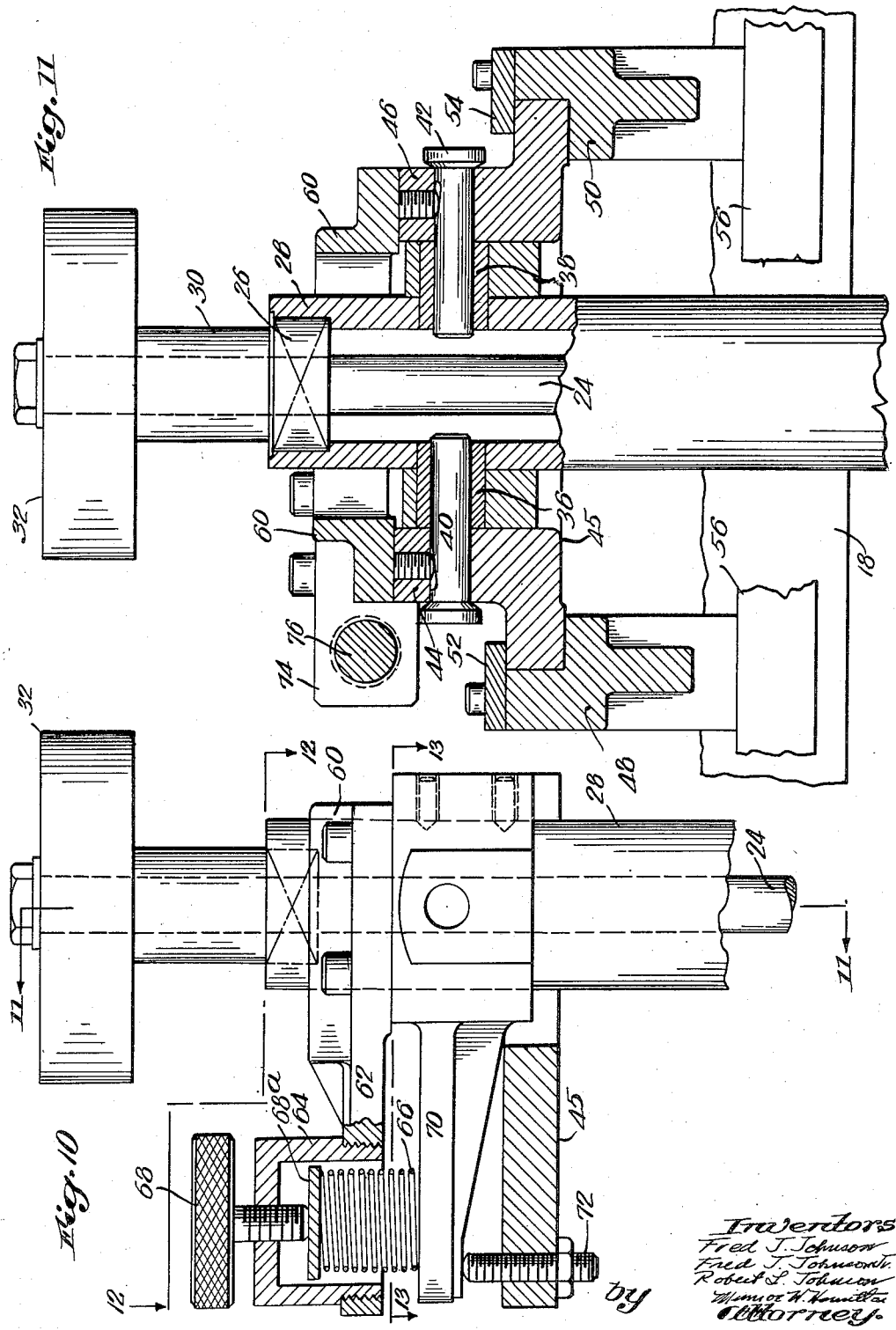

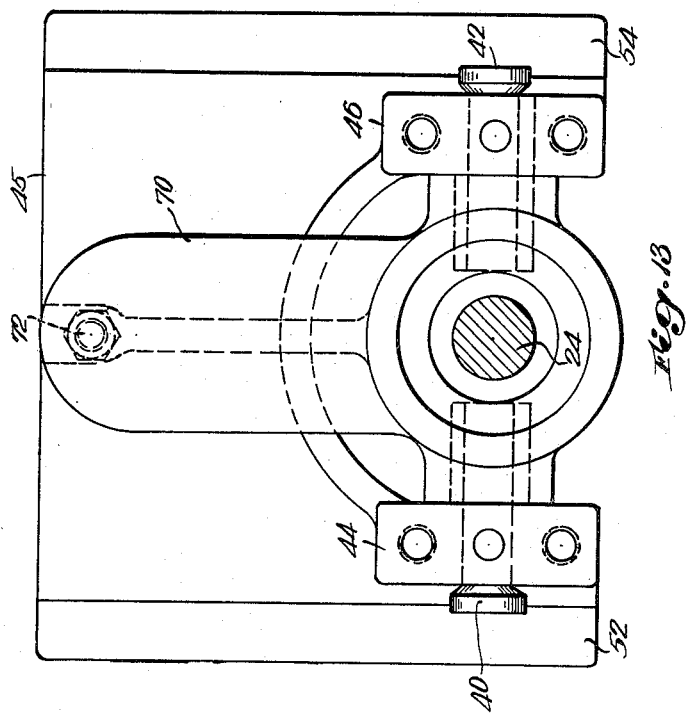
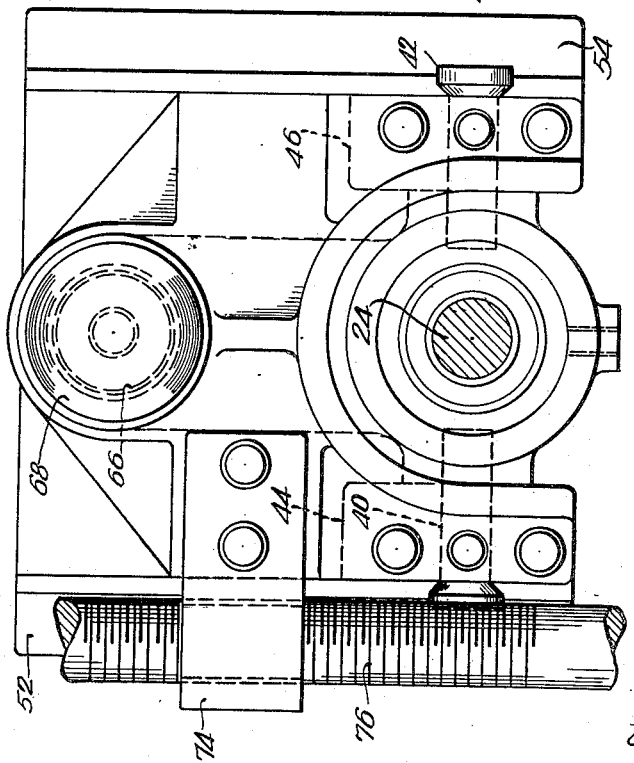

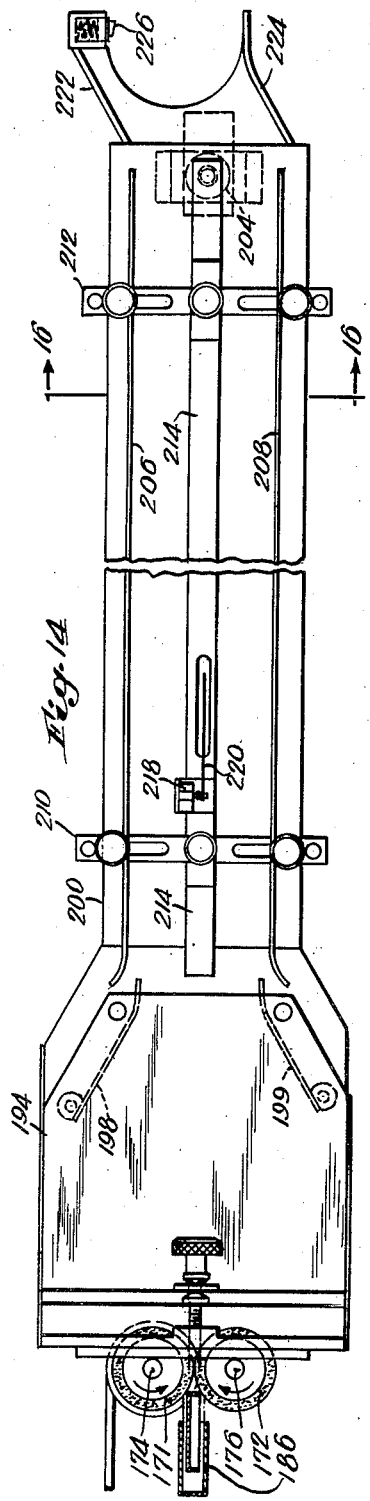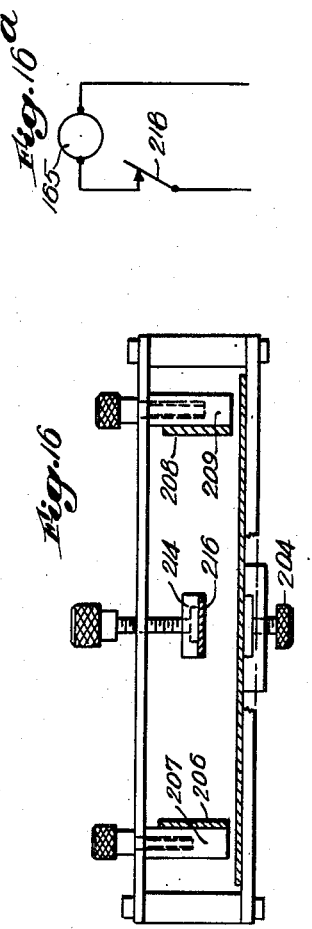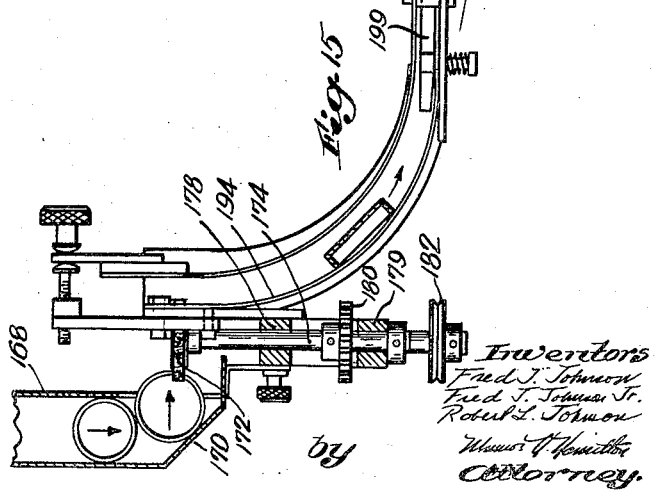

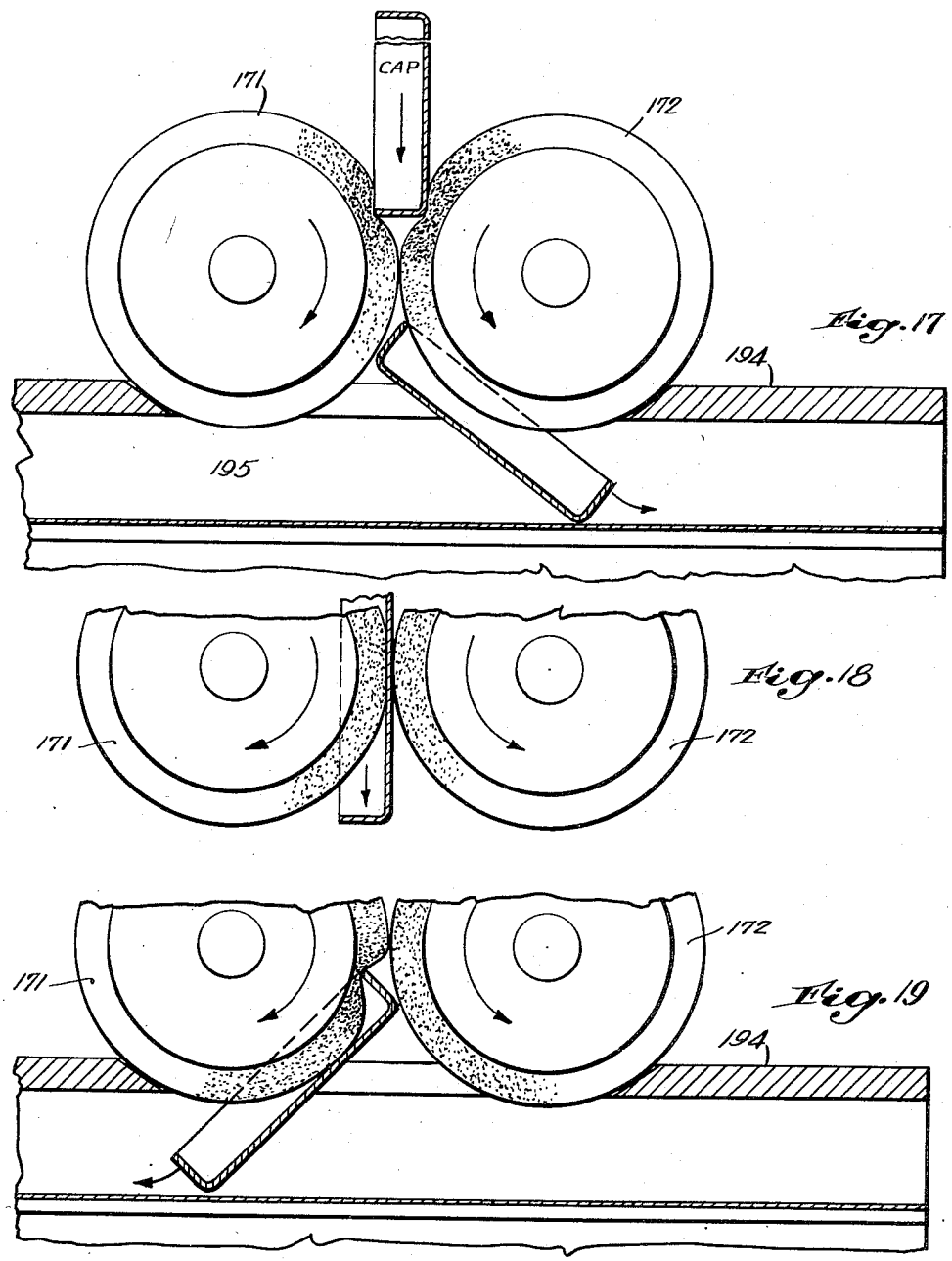

Aug. 14, 1956
F. J. JOHNSON ET AL
2,758,434
MACHINE FOR FEEDING AND APPLYING
SCREW THREADED CAPS TO JARS
Filed Aug. 10, 1951
16 Sheets—Sheet 12
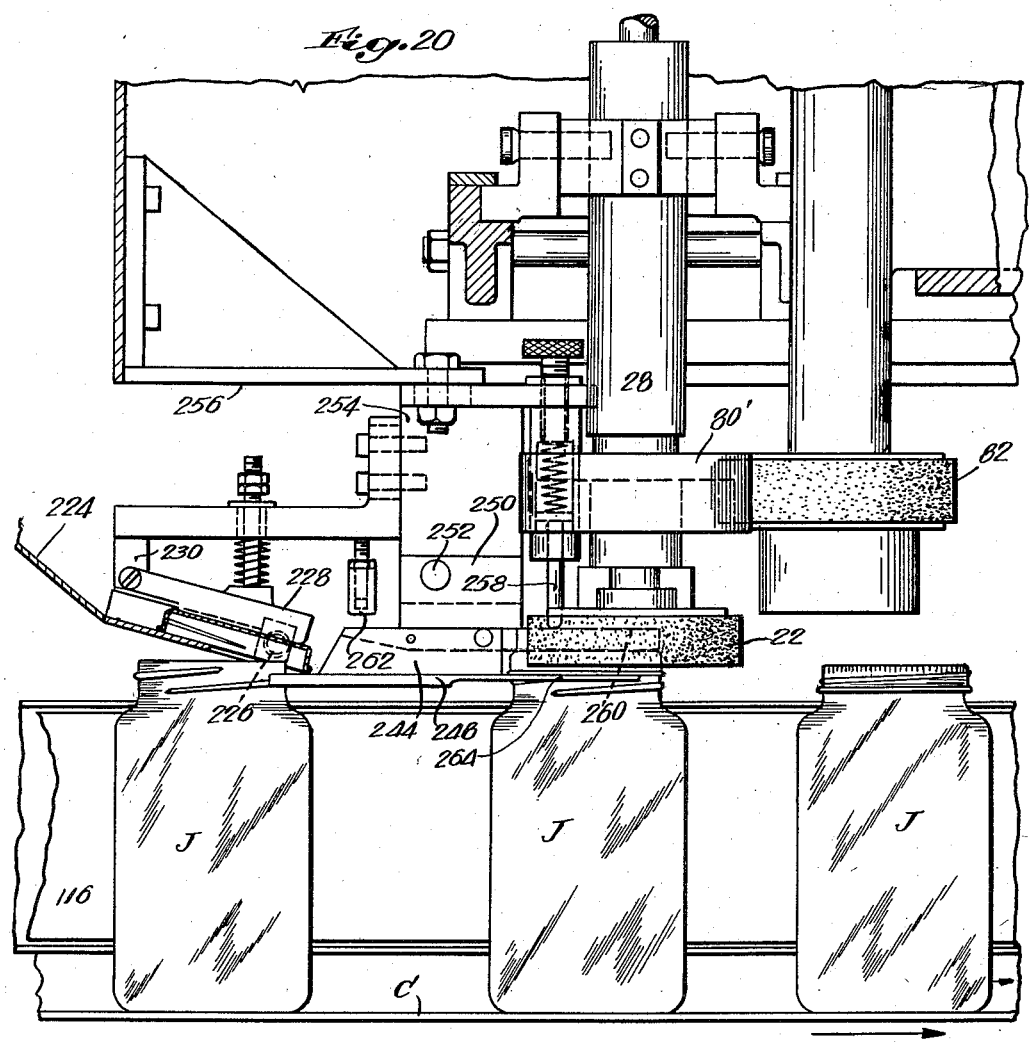
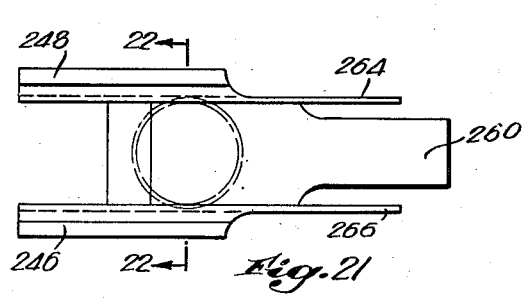
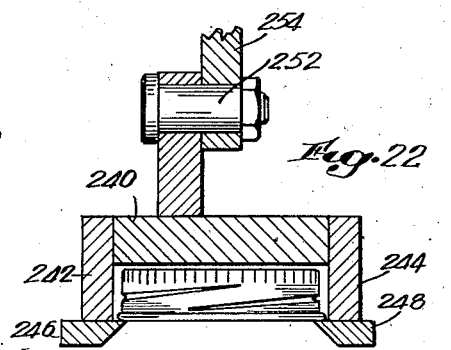

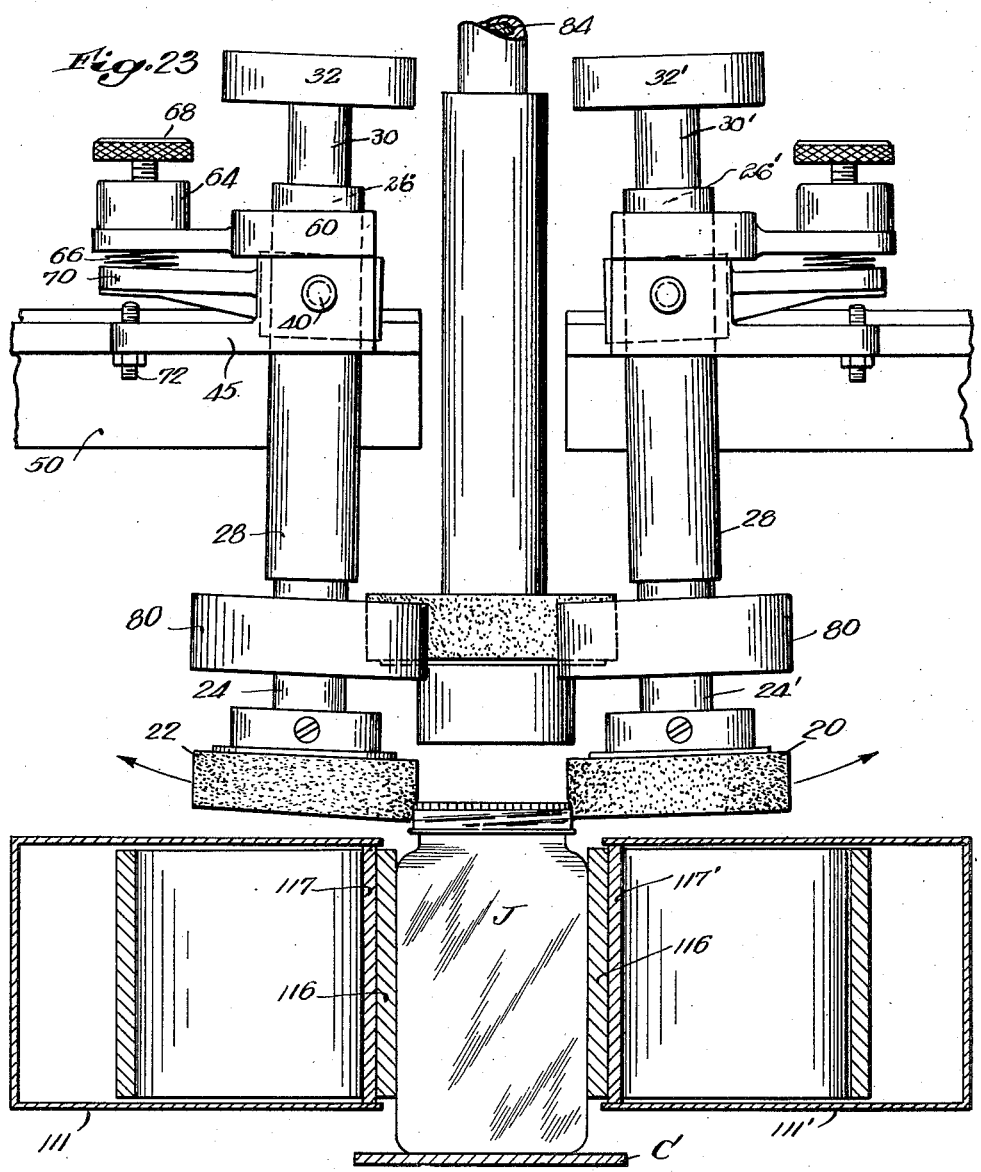

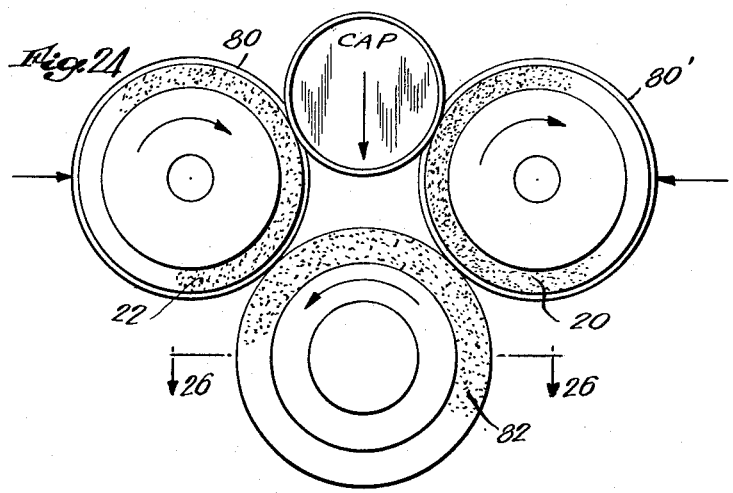
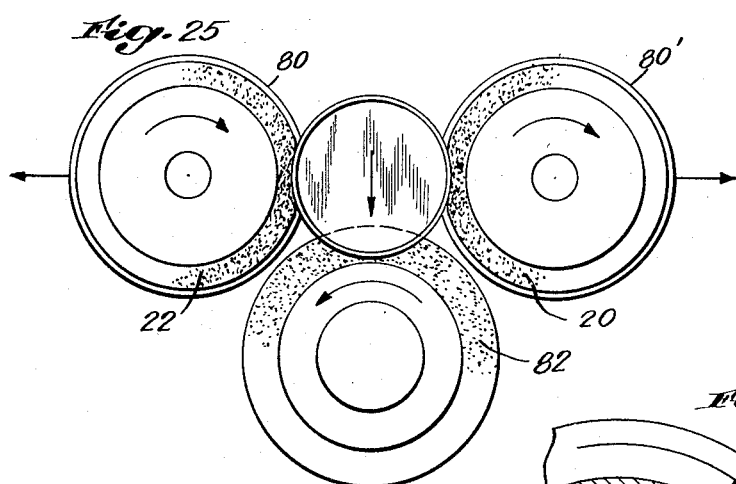
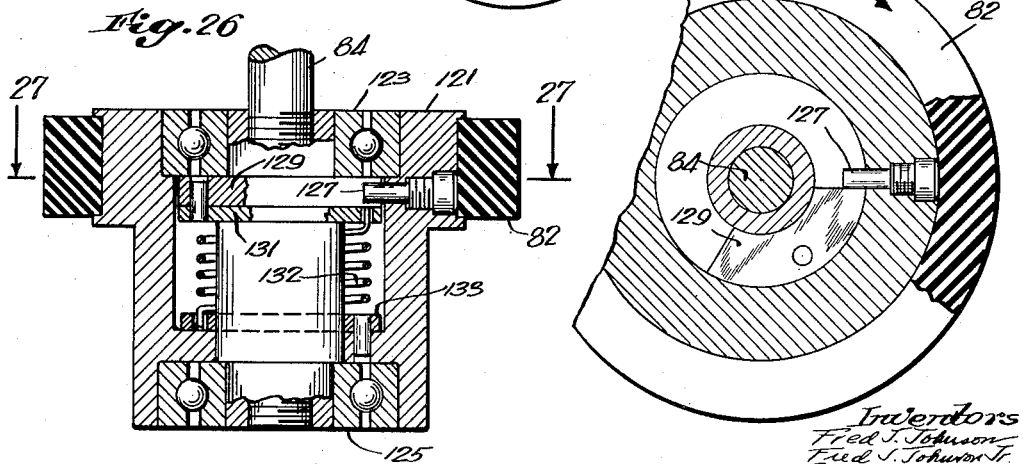

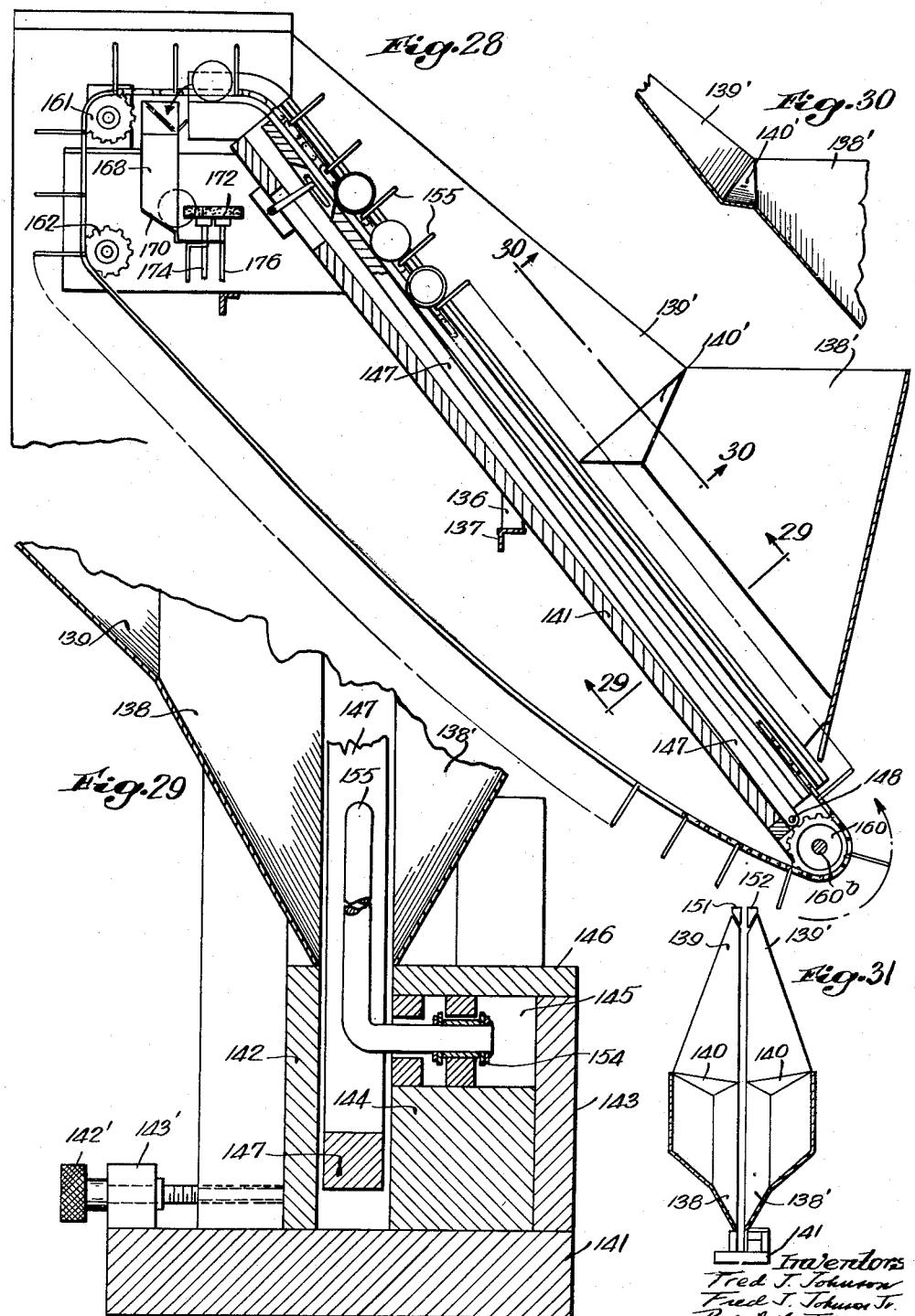

Aug. 14, 1956  F. J. JOHNSON ET AL  2,758,434
MACHINE FOR FEEDING AND APPLYING
SCREW THREADED CAPS TO JARS
Filed Aug. 10, 1951  16 Sheets-Sheet 16
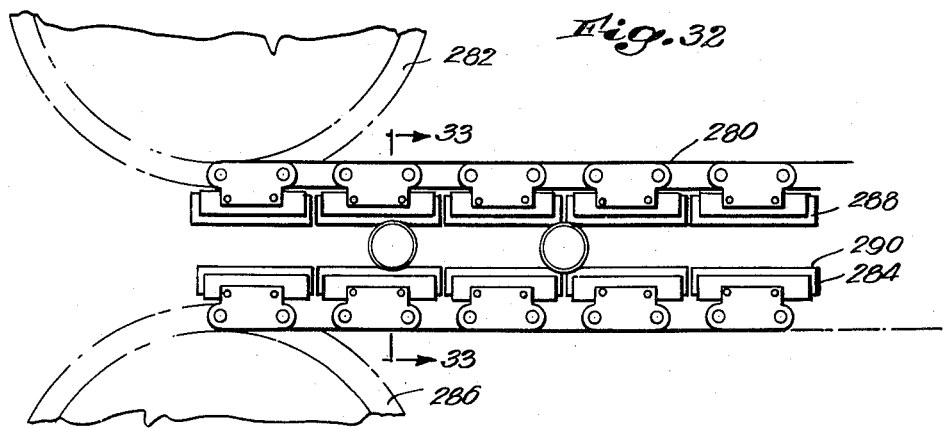
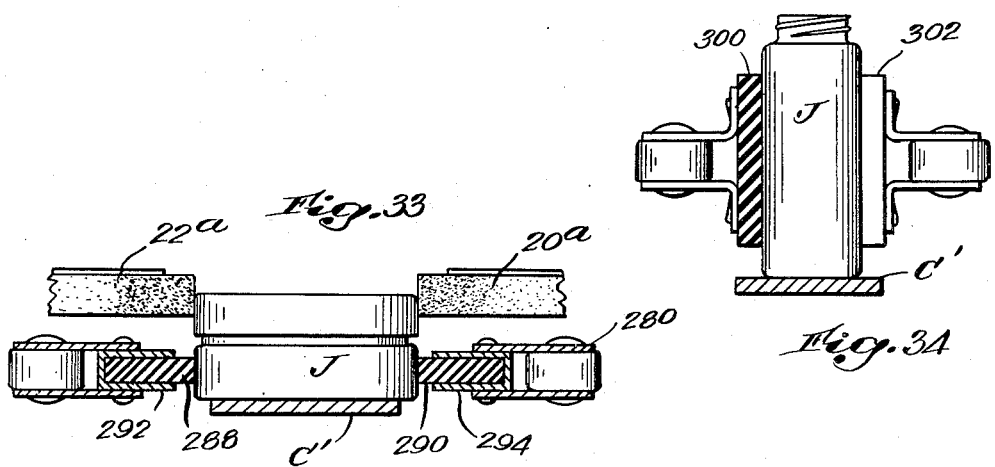
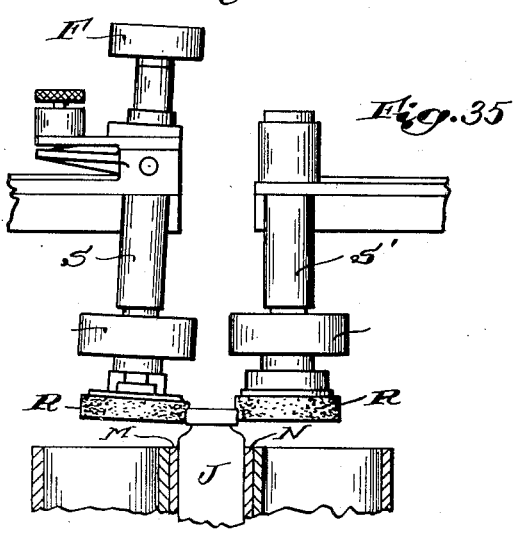

United States Patent Office 2,758,434
Patented Aug. 14, 1956

2,758,434

MACHINE FOR FEEDING AND APPLYING SCREW THREADED CAPS TO JARS

Fred J. Johnson, Fred J. Johnson, Jr., and Robert L. Johnson, Needham, Mass., assignors to The Kinex Company, Incorporated, Needham Heights, Mass., a corporation of Massachusetts Application August 10, 1951, Serial No. 241,236

19 Claims. (Cl. 53—315)

This invention relates to methods and apparatus for engaging threaded bodies with one another and especially for applying caps or covers to jars, bottles, and similar containers. For convenience those containers to which the invention is applicable will be herein referred to, collectively, as "jars." The term "caps" is intended to include various types of covers, such as screw caps, caps formed with locking lugs, pressed seal type caps, and the like.

Prior art machines employing rotary driving forces for capping jars automatically have been complicated, subject to various adjustment difficulties, and particularly have failed to provide for high speed capping in a satisfactory manner. In this connection there are two long standing problems which have not been solved and, so far as we are aware, have not been successfully dealt with in earlier patents.

One of these problems relates to the tendency for screw caps to become cross-threaded as a result of the caps being improperly registered with their containers during high speed capping operations, whereby a faulty seal is produced. The second problem is closely related to the first and arises out of the fact that a great many screw caps commonly used at the present time are composed of plastic materials of a relatively light construction. For high speed capping, rotary driving forces must be employed. If at any point in the actual turning of the cap about its container an excessive rotary driving force is exerted on caps of light construction, these caps have a tendency to become cracked or broken every now and then, which also results in a faulty seal and expensive rehandling. Furthermore, in more resistant types of caps the rotary driving force if utilized at a sufficiently great intensity to produce desired speed of capping, may operate to scratch, scar, or otherwise damage the outer surfaces of the caps in a manner which is highly objectionable.

The present invention is concerned with the two problems noted above, and aims to devise capping methods and apparatus by means of which a satisfactory control of rotary driving forces for capping purposes may be realized with substantial elimination of cross-threading and with breaking and damaging of caps being almost entirely eliminated. It is also an object of the invention to provide a rapid and dependable method of capping jars, as well as improved methods and apparatus for facilitating the handling and feeding of caps to a capping station. Still another object is to devise a method which may have application generally in controlling the tightness with which two threaded bodies are engaged with one another.

These and other objects and novel features will be more fully understood and appreciated from the following description of a preferred embodiment of the invention selected for purposes of illustration and shown in the accompanying drawings, in which:

Fig. 1 is a plan view, diagrammatically illustrating a typical jar filling machine and conveyor member with which the capping machine of the invention has been associated;

Fig. 2 is a side elevational view of the capping machine shown in Fig. 1, as viewed from a point directly in front of the jar conveying means;

Fig. 3 is a plan cross-section taken on the line 3—3 of Fig. 2;

Fig. 4 is a front elevational view, further illustrating portions of a hopper and cap conveying mechanism with a capping apparatus shown supported in a raised position at one side thereof;

Fig. 5 is a rear elevational view of the capping machine with a rear panel having been removed;

Fig. 6 is a plan view of the specific capping apparatus shown with a top cover having been removed from the housing supporting the capping apparatus;

Fig. 6a is a cross-section taken on the line 6a—6a of Fig. 6;

Fig. 9 is a cross-section taken on the line 9—9 of Fig. 6;

Fig. 9a is a cross-section taken on the line 9a—9a of Fig. 6;

Fig. 10 is an enlarged elevational view of a part of the capping roll mechanism;

Fig. 11 is a cross-section taken on the line 11—11 of Fig. 10;

Fig. 12 is a cross-section taken on the line 12—12 of Fig. 10;

Fig. 13 is a cross-section taken on the line 13—13 of Fig. 10;

Fig. 14 is a detailed plan view illustrating a guide mechanism for caps;

Fig. 15 is an elevational view of the structure shown in Fig. 14;

Fig. 16 is a cross-section taken on the line 16—16 of Fig. 14;

Fig. 16a is a wiring diagram showing the circuit of the magazine switch;

Fig. 17 is a plan view fragmentarily indicating roll members used in guiding the caps, and illustrating one typical cap turning operation;

Fig. 18 is a view similar to Fig. 17 illustrating an alternate capping position which may be assumed between the roll members;

Fig. 19 is a view similar to Fig. 18 but showing the cap indicated in Fig. 18 in a more advanced and rotated position;

Fig. 20 is a detailed elevational view showing portions of the capping mechanism with jars and caps passing through the capping station;

Fig. 21 is a bottom plan view of a levelling guide member;

Fig. 22 is a cross-section taken on the line 22—22 of Fig. 21;

Fig. 23 is another detailed elevational view, somewhat enlarged, to illustrate the position assumed by the capping rolls when a jar and cover member passes therebetween;

Fig. 24 is a bottom plan view of the capping roll and driving roll assembly of the invention, showing a cap about to be entered between the capping roll;

Fig. 25 is a view similar to Fig. 24 but illustrating the cap in a more advanced position in which a third impeller roll has been moved out of driving relationship with the driving rolls;

Fig. 26 is a cross-sectional view taken on the line 26—26 of Fig. 24;

Fig. 27 is a fragmentary cross-section taken on the line 27—27 of Fig. 26;

Fig. 28 is a fragmentary side elevational view of a part of the cap conveyor mechanism;

Fig. 29 is a cross-section taken on the line 29—29 of Fig. 28;

Fig. 30 is a cross-section taken on the line 30—30 of Fig. 28;

Fig. 31 is a detailed plan view of the hopper mechanism;

Figs. 32, 33 and 34 illustrate a modified jar gripping apparatus;

Fig. 35 is an elevational view showing a modification of capping roll mechanism.

Figure 7:
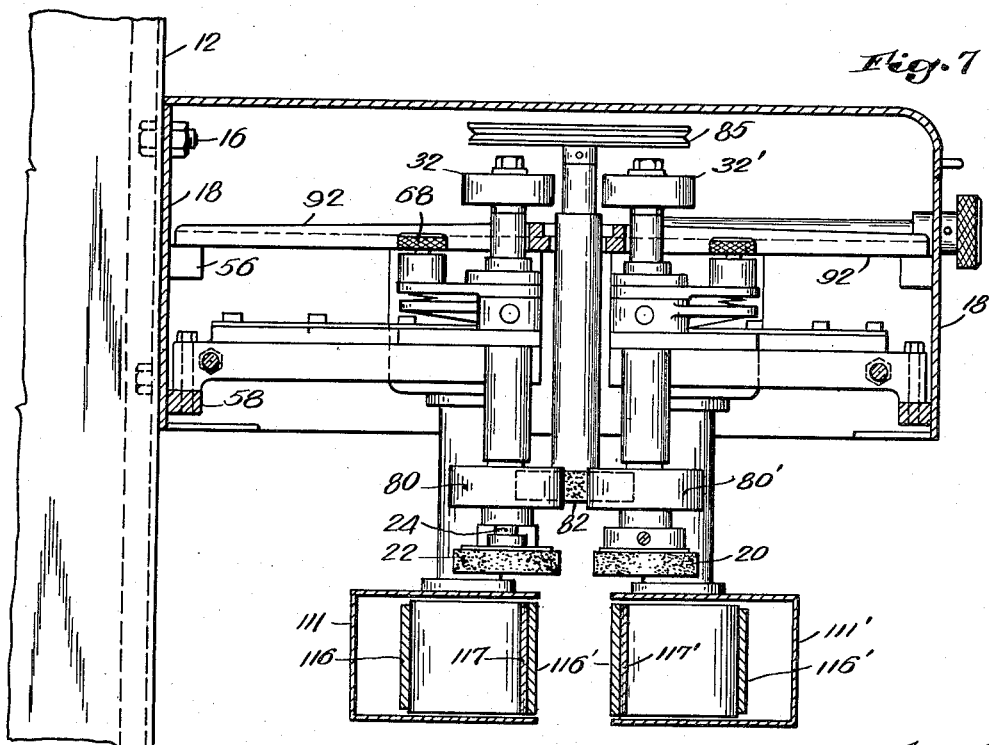
Fig. 7 is a cross-section taken on the line 7—7 of Fig. 6.

The mechanism illustrated in the above noted figures, constitutes one preferred embodiment of means devised to carry out a novel method which we have discovered for screwing together two threaded bodies such, for example, as a screw cap and jar.

Essentially the method of the invention provides for applying to a threaded member, such as a screw cap mounted on a jar, a predetermined amount of kinetic energy in the form of a rotary frictional driving force, wherein the kinetic energy is so chosen and controlled that it can be, and is, substantially absorbed and used up in turning the cap into a desired state of tightness on its jar without over-stressing the cap. It is inherent in this novel method of capping that the rotary frictional driving force vary in intensity inversely with the tightening of the bodies as they are moved into fully threaded engagement with one another, and thus the danger of over-stressing either one of the bodies is greatly minimized.

We find that one satisfactory means of thus controlling and applying kinetic energy is comprised by a combination of one or more capping rolls associated with a special impeller roll unit, and the capping apparatus of the invention is built around this combination of rolls. The manner in which this is accomplished will be more readily understood from the following description of the apparatus shown in the drawings.

Referring to Fig. 1, there has been illustrated at the left-hand side of this figure, somewhat diagrammatically, a conventional jar filling machine F to which jars J are carried on a conveyor member A, as indicated by the arrow. From the filling machine F the filled jars are moved along on a second conveyor member C to the jar capping machine of the invention which has been shown in plan at the right-hand side of Fig. 1.

It should be understood that the conveyor C is intended to be illustrative of any one of various means for feeding a filled bottle or jar into the capping machine, and the conveyor C, or a member equivalent thereto, although in some cases not furnished as a part of the machine of the invention, may be included as one of its component parts.

In general, our improved capping machine is comprised by a supporting structure normally resting upon the floor of a work-room, or other available surface. A capping unit is secured, as shown in Figs. 2, 4 and 5, at one side of the supporting structure in a suitably raised position to overlie a conveyor on which jars are conveyed, as has been conveniently represented by the conveyor C above noted. By designing the capping apparatus as a compact, independently comprised unit, and by attaching this unit at the side of the supporting structure, the capping machine may be very quickly brought into operating relationship to a conveyor system which has already been installed, and is in use, without necessitating changes or substantial alterations.

The organization of the various parts of the capping machine has been designed with the above point especially in mind. These parts include, in addition to the capping apparatus itself, a cap hopper formed in the upper side of the supporting structure, together with a cap conveyor running through the hopper; cap guideway means for guiding caps from the conveyor; a cap magazine adapted to support a cap in the path of travel of a jar; and, finally, a cap levelling device for maintaining a cap in correctly registered relationship with respect to a jar just prior to and during the operation of screwing the cap in place.

Considering the various component parts of the machine in greater detail, numeral 10 denotes base members which may be arranged at the under side of the four lower corners of a machine casing 12. The casing is comprised by a number of removable panel elements secured to upright frame members 14. Solidly secured to one side of the casing by means of bolts 16, Fig. 7, is a housing 18 which contains the capping unit of the invention shown in Figs. 2, 4 and 5.

*Jar capping apparatus*

The capping unit in a preferred form has mounted therein a pair of capping rolls 20 and 22 which are rubber covered and pivotally supported in spaced-apart relation, as shown in Figs. 7 and 23. The rolls are normally located a distance apart slightly less than the diameter of a cap to be applied to a jar. In this position the rolls are designed to be forced apart by a cap passed therebetween and will, momentarily, engage at either side of the cap when the latter is mounted over a jar J supported on a conveyor C in the manner suggested in Figs. 20 and 23.

The capping roll 22 is fast on a shaft 24 mounted for rotation about a vertical axis. At its upper and lower ends the shaft 24 is rotatably received in bearings 26, as shown in Fig. 11. The latter bearings 26 are carried at the top and bottom of a pivoted tubular support 28. A spacer element 30 located around the shaft 24 above the bearing 26 maintains a kinetic energy roll 32 at the top end of the shaft in a position such that it may readily be removed by unscrewing the nut 34.

The pivoted tubular support 28 has transversely disposed, through two opposite sides, bushings 36 and 38, Fig. 11, which are pivotally supported on two pins 40 and 42 fixed in respective bracket portions 44 and 46 forming a part of a plate 45. The plate and brackets are, in turn, slidably received on rails 48 and 50, being held in place by strips 52 and 54, respectively, as shown in Fig. 6 and also, in part, in Figs. 11, 12 and 13. In alignment with the rail 50 is a second rail 50' and a corresponding strip 54'.

The outer ends of the rails 48, 50 and 50' are solidly secured against the sides of the casing 12 and are supported by blocks 56 and 58 welded, or otherwise attached, to the inner wall of the casing. The inner ends of the rails 50 and 50' are spaced apart to define a guideway, hereinafter described, and, to maintain these ends, a separate supporting member is provided comprising a T-bar member 92 having its head resting on the blocks 56 and 58, and its leg carried by a block 57, as shown in Fig. 6. The inner ends of rails 50 and 50' are suspended from hangers 50a and 50b, more clearly shown in Fig. 6a.

At the upper sides of the bracket portions 44 and 46 is solidly secured a yoke member 60 which is formed with an extension 62 in which is received a threaded cover 64, Fig. 10, housing a spring member 66 which is adjustable by means of a set screw 68 bearing against a thin plate member 68a. A tongue 70 is pivotally supported integrally with the tubular member 28 for engagement against the bottom of the spring 66 and is held against the spring to slightly compress it by means of an adjustable stop 72. Normally the shaft 24 assumes a substantially vertical position.

With this arrangement the entire capping roll unit, including the capping roll 22; pivoted support 28; and driving shaft 24, can be swung out of a vertical position against the resistance of the spring 68 as a cap is passed between the two capping rolls. The spring 66 will immediately cause the capping roll 22, and its drive mechanism, to return to a normal vertically disposed position when the cap has passed out of engagement with the capping roll.

In a similar manner the roll 20 and shaft 24' are driven by mechanism corresponding to that above described and indicated by the same, but primed, numerals. The yokes 60 and 60' also have mounted thereon adjustment blocks 74 and 74' which are threaded to receive a right and left lead screw 76 extending transversely across the capping apparatus, as shown in Figs. 6, 11 and 12. When the screw 76 is rotated the two rolls 20 and 22, together with their associated driving mechanism, may be moved toward and away from one another to any desired extent, thus enabling the rolls to be spaced properly for any given diameter of jar cap.

In accordance with the invention, rotative movement of the shafts 24 and 24', together with the rolls 20 and 22, is carried out in such a manner that passage of a jar cap between the rolls 20 and 22 will automatically interrupt the driving force which causes the rolls to be rotated. This is accomplished by securing on the shafts 24 and 24', respectively, frictionally driven rolls 80 and 80' which are located just above the capping rolls 20 and 22, as illustrated particularly in Figs. 7 and 23, so that a jar may freely pass thereunder.

The rolls 80 and 80' are simultaneously engaged and driven by a third impeller roll 82 fast on an impeller shaft 84. The impeller roll is preferably composed of a yieldable material, such as rubber, while the friction rolls 80 and 80' are preferably composed of a hard, unyielding substance, such as steel, or other metal.

In its normal driving relationship the shaft 84 occurs in parallel relationship to the shafts 24 and 24', and it will be noted that the lower end of the shaft terminates, as shown in Fig. 23, well above the top of the cap on the jar J. Intermediate portions of the shaft 84 are mounted in bearings 86, Figs. 6 and 9, rigidly supported at one end of a slide 88, in turn carried in a slide support 90 bolted to the underside of the T-bar member 92.

A threaded rod 100 is longitudinally supported through the housing 12 having its inner end threaded to the slide 88 and its outer end provided with a knurled head 101. Turning the screw 100 allows the impeller roll 82 and shaft 84, together with slide 88, to be moved longitudinally toward and away from the capping rolls 20 and 22 in a slot 92a of T-bar 92 and between the ends of the rails 50 and 50', so that suitable adjustment may be made at this point to take care of change in position of the driven rolls 80 and 80' with different cap sizes.

The shaft 84 preferably is belt-driven. Mounted at the upper end of this shaft is a pulley member 85 adapted to be driven by a belt 87 on a second pulley 89, in turn mounted for vertical rotation about a shaft received at the opposite end of the housing 12. The pulley 89 and shaft are driven by a motor 95, as indicated in Fig. 6.

The pulley 89 also drives a belt 83 running to a pulley 93 which operates a gear reducer 96. From this gear reducer power is transmitted through a sprocket 81 and chain 83a to a second sprocket 85a rotatable on a shaft 85b received in a bearing 85c at the inner side of the casing, as shown in Fig. 6. The sprocket 85a is connected through a clutch 113 to the shaft 85b. This drive mechanism operates jar gripping side belts which function to convey a jar through the capping station and to provide lateral support at either side of the jar so that each jar is properly gripped as a cap is screwed into place.

Figure 8:
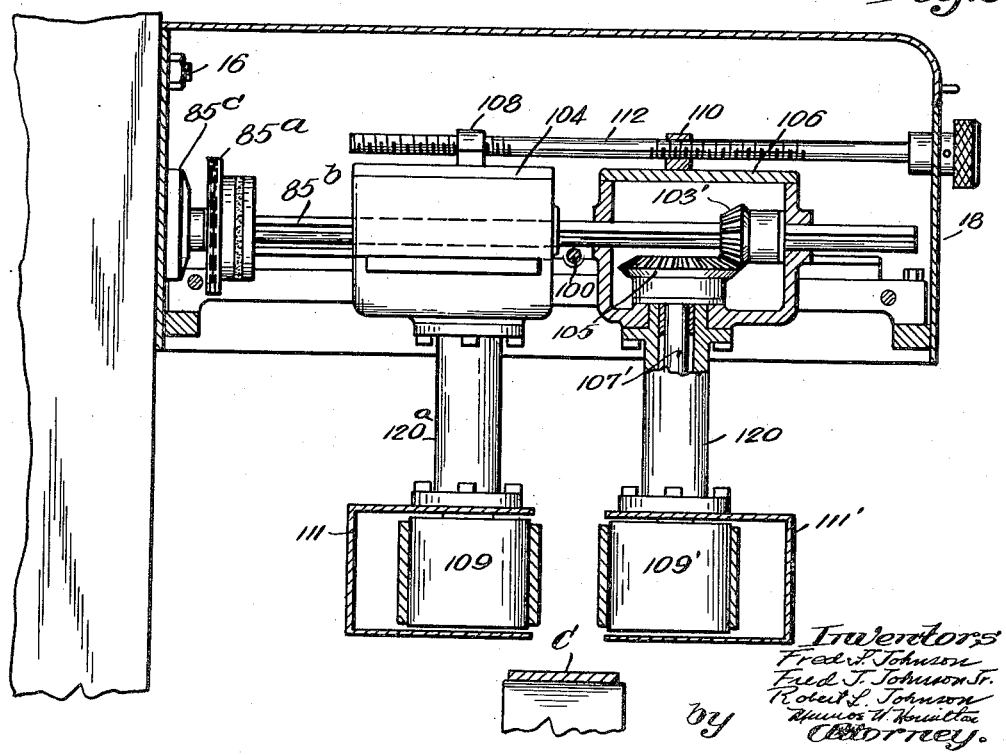
Fig. 8 is a cross-section taken on the line 8—8 of Fig. 6.

It will be seen that when a different jar size is dealt with the side belts must be adjusted in their spacing, and to do this without changing or interfering with the driving mechanism above described, we provide a pair of gear boxes 104 and 106 which have the shaft 85b received therethrough, in the manner suggested in Fig. 8.

At the upper side of each of these gear boxes are threaded brackets 108 and 110 through which is engaged a right and left lead screw 112 mounted through one side of the casing 12, as also shown in Fig. 8. Turning the lead screw will cause the gear boxes 104, 106 to move toward and away from one another. In any position of adjustment thus arrived at, the shaft 85b functions to drive pinions 103 and 103' slidably keyed on this shaft. In each of the gear boxes, at the bottoms thereof, are rotatably mounted bevel gears 105 and 105' fast on shafts 107 and 107' having fixed at the lower ends thereof pulley members 109 and 109', better shown in Figs. 7 and 8.

Belt housings consisting of three-sided enclosures 111 and 111' protect the pulleys and side belts 116 and 116' which are driven by the pulleys and which extend rearwardly to pass around a second set of spaced-apart vertically supported pulleys of which one, namely pulley 118, is shown in Fig. 2, carried in the belt enclosures 111 and 111'. The forward ends of these belt enclosures are slidably supported on a rod extending between brackets 120 and 120'. The latter brackets also support at points above the rod a right and left lead screw 122 which is, in turn, threaded into respective hangers of the belt enclosures as is better shown at the extreme left-hand side of Fig. 6. The opposite ends of the belt enclosures 111 and 111' are supported by bearing housings, as 120a, Fig. 9.

The belts 116 and 116' normally run with enough tension to exert an appreciable lateral supporting action for gripping a jar and conveying it through the capping station, in the manner suggested in Fig. 23. In addition to this supporting action, however, an additional gripping effect is provided by mounting on each of the belt enclosures 111 and 111', rigid backing plates 117 and 117', as has been illustrated in Fig. 7. These plates are arranged on the respective enclosures 111 and 111' at those points where the belts are holding the jars against rotation during the capping operation. If desired, these backing plates 117 and 117' may be resiliently supported from a point in the rear so that they tend to yieldably urge the side belts against the jar as the belts are passing through the capping station. Preferably the belts 116 and 116' are formed of a frictional type material, such as rubber, or a combination of rubber impregnated fabric.

It will be evident that if the rolls 20 and 22 are forced apart by the passage of a jar cap therebetween, in the manner suggested in Figs. 23 and 24, for example, the rolls 80 and 80' will simultaneously be thrown out of driving relationship with respect to the impeller roll 82, as indicated especially in Fig. 25. As soon as this occurs the rolls 20 and 22 will continue to rotate for a short time as a result of the kinetic energy which is stored in them and represented by their weight, as well as the weight of the respective shafts 24 and 24' and also the weight of the two kinetic energy rolls 32 and 32' mounted at the upper ends of these shafts, as described above.

An important feature of the invention resides in selecting the parts above described so that they will produce, at each point of interruption, an amount of kinetic energy which is substantially equivalent to, or approximately the amount required, to tighten the jar cap to a predetermined degree of tightness about the jar J, without over-stressing the cap in any way. It will be obvious that by starting with a kinetic energy mass less than that required to do the job described, and then supplying an additional mass in the form of bodies, such as the kinetic energy rolls 32 and 32', it is possible to arrive at substantially the correct amount of kinetic energy. We may also, at any time, by substituting for the kinetic rolls 32 and 32', other rolls of a different mass, vary the kinetic energy forces which will be available to thereby adapt the machine to operation with a very wide range of jars and jar cap sizes.

In thus accomplishing this objective it will be apparent that we are able to avoid any danger of breaking or cracking the jar caps, having once determined a kinetic energy value which is suitable for a given type of jar cap construction. Likewise, we may avoid any appreciable damaging or scarring of the caps without, at any time, losing accuracy in arriving at a proper degree of tightening and yet being able to maintain a very high speed capping operation.

In connection with avoiding trouble in adjusting the side belts 116—116' of the machine, we have also provided a friction clutch for protecting the driving mechanism which operates these members. This clutch has been indicated by the numeral 113 in Figs. 6 and 8, being of the usual conventional friction type and being mounted between the shaft 85b and the shaft extension which is supported in the bearing 85c. The purpose of this friction clutch is to prevent a sudden overloading of the driving mechanism from taking place should the side belts 116—116' at the forward pulleys be accidentally adjusted a distance apart too small to allow a jar to pass therethrough during a capping operation. It has also been found that in adjusting the machine for different jar sizes, it is sometimes difficult to get just the right setting at both sets of side belt pulleys. In either case, if a jar becomes slightly jammed between the forward set of pulleys, much damage to the driving mechanism can take place. With the friction clutch described the sudden load which may develop is easily absorbed and damage to the driving mechanism is avoided.

In capping successive jars following closely upon one another, it is essential to efficient operation that the impeller shaft 84 and roll 82 be constantly rotated at relatively high speeds in order to provide for repeatedly accelerating the two capping rolls with each capping operation. Acceleration must take place with the capping rolls starting practically from a "rest" position, for each capping operation. In this connection a problem arises in that a very considerable torque load is developed in the shaft 84 and roll 82, as said roll comes into contact with the peripheries of rolls 80 and 80'.

To avoid difficulty in this connection we have devised a special torque arrestor mechanism which has been shown in detail in Figs. 26 and 27. As indicated therein, the impeller roll body 82 is mounted around a cylindrical shell 121 which is rotatably supported about the shaft 84 on bearings 123 and 125. Transversely disposed through the cylindrical shell 121 is a pin 127 which projects radially inwardly, as shown in Fig. 27, so that, when rotated, it may at one point engage against a stop 129 carried on a washer 131. One end of a spring 132 is connected to washer 131 and the opposite end of the spring is anchored in a washer 133 which is fixed to the cylindrical sleeve 121. By means of this arrangement the torque force developed in contacting the roll body 82 with rolls 80 and 80' is largely absorbed in rotating the cylindrical shell through a limited arc of rotation against the resistance of the spring 132.

*Cap furnishing mechanism*

Considering next the means for delivering caps to the capping apparatus above described, attention is directed to a cap hopper structure shown in Figs. 1, 2, 4, 5 and 28, wherein numeral 135 denotes the cap hopper in which a mass of loosely disposed caps are contained. It should be understood that such caps are intended to be representative of any cupped body which is desired to be handled in the hopper.

In furnishing individual caps which are mechanically selected from a loose mass of such caps, one immediate problem which arises has to do with the operation of locating the selected caps so that they will all lie in the same relative position and will all be fed to the capping station with their top sides uppermost and occurring in a substantially horizontal manner to correspond with the horizontally disposed jar tops fed through the capping station on the conveyor C.

It is pointed out that up to the present time it has been somewhat difficult to mechanically pick out those caps which are right side up and to reject caps which are up-side down. Extensive and complicated mechanism has heretofore been devised and employed to select caps which are delivered right side up and to route rejected caps back into the hopper in one way or another.

In accordance with the present invention we have successfully overcome this difficulty and have devised a unique hopper and conveyor unit, together with a cap guiding apparatus cooperating therewith, so that all caps coming from the hopper are utilized, and are always correctly positioned to be fed through a magazine into the capping station. Our improved cap handling mechanism is based on the novel concept of locating successive caps on edge while they are in the hopper and then receiving caps coming from the hopper on edge and guiding them into a position in which they can be turned about a vertical axis, either in one direction or another, and ultimately disposed right side up as they enter a magazine.

For these purposes, therefore, we have devised a hopper which is constructed of two similar sections mounted in an inclined position in the casing 12 on blocks 136 solidly secured to transverse frame members 137, as noted in Fig. 28. The sections are formed with lower sloping side portions 138, 138' which are connected to a second set of upper side portions 139, 139' of less sharply angled character, as indicated in Figs. 28 and 29, by means of shouldered portions 140, 140'.

The pitch or angularity of the side portions 138, 138' diverges outwardly and upwardly, as shown in Fig. 31. The purpose of this is to cause caps which are supported in the hopper between the lower sides to be guided downwardly, and at some points to be tipped over in to a position such that they tend to stand on edge.

On order to further provide for holding the lower caps in an "on edge" position, the side sections are, at their bottoms, maintained in spaced-apart relationship, as better shown in Fig. 29. This may be conveniently accomplished, for example, by providing a bottom plate 141 on which are secured side walls 142, 143, one of which may, if desired, be laterally adjustable by means of a screw 142' in a bracket 143'. A bar 144 is secured to the wall 143. Mounted in spaced relation above the bar is a plate 146 which forms a space or guideway for a conveyor chain.

The opening occurring between the wall 142 and the members 144 and 146 comprises a slot in to which caps seek to fall and become supported on edge. An adjustable bottom consisting of an arm 147 pivoted at 148, Fig. 28, functions to support the lower sides of the caps while on edge, and the arm 147 may be adjusted by means of a pivoted lever 148a, Fig. 2, adapted to be pinned in any one of the holes 149 formed in a bracket 150 secured at the head or top of the hopper structure.

At the top of the casing 12, as viewed in Fig. 4, are secured two vertical guideway plates 151 and 152 which are welded or otherwise attached in some convenient manner to the upper ends of the hopper sides 139, 139', thereby defining a cap slot 153.

Caps are fed through this slot by means of a conveyor chain 154 along one side of which is fastened pins 155. The chain 154 passes through the guideway 145, above described, and is supported at its lower end about a sprocket 160, and at its upper end about sprockets 161 and 162, Fig. 28. Straps 160a connected to the hopper sides 138, 138' extend downwardly to support a shaft 160b on which the sprocket 160 is rotatably mounted, as suggested at the lower right-hand side of Fig. 4. The sprocket 161 is driven through a friction clutch 163 by a gear reducer 164 belted to a motor 165. This gear reducer is received on a base member 166 mounted on a vertical support 167, in turn solidly secured on a frame member 168.

The pins 155 are of sufficient length to extend well above the caps carried on the conveyor member, as suggested in Fig. 28, and are spaced apart a distance sufficient to receive one or more caps between any two adjacent pins. It will be observed that the pins 155 may assume angular positions and they extend outwardly during upward travel of the chain in a position such that each pin bears against a cap at a point below the center of gravity of the cap. This tends to cause the caps to roll along the adjustable bottom 147 and greatly facilitate their travel.

As the conveyor chain approaches the top of its travel, as illustrated in Fig. 28, it moves in a substantially horizontal direction for a short distance along a supporting edge which terminates abruptly. The caps are then free to fall in to a cooperating down chute 168. This chute is of tubular construction, open at its top, and having two of its sides spaced apart a limited distance which will receive a cap in an "on edge" position and maintain the cap in this position as it drops downwardly against an inclined shelf 170.

Arranged directly in front of the inclined shelf 170 are two cap turning rolls 171 and 172 rotatable about vertical axes and presenting yieldable rubber or rubber-like peripheral surfaces. The nip point of these two rolls is arranged to lie in a suitable position to receive a forward edge of a cap as it drops down on to the shelf 170, and to draw the cap between the rolls in the manner illustrated in Figs. 14, 15 and 28.

As the caps pass between the turning rolls 171 and 172, a selective turning action may be carried out, which action is peculiar to the inherent shape of the cap edge and which is fully taken advantage of by forming the rolls 171 and 172 of a soft yieldable material, such as rubber, in to which an edge of a cover may sink as the cap passes between the rolls. A basis for selective positioning resides in the fact that the caps will be turned about a vertical axis in a direction corresponding to the direction in which the cap edges extend at the time they pass through the nip point of the rolls. It will be apparent that this is due to the fact that the edges sink in to the soft yieldable surface while the flat top side of the cover resists sinking into the roll and, consequently, the cap is turned. In either of the resulting positions in to which the caps are vertically turned, the cover top will assume a foremost position and can be guided so that they will always be right side up when passed along a conductor, as hereinafter described. Thus, in Fig. 17, we have shown rolls 171 and 172 with one cap leaving after having been turned in one direction and another cap about to enter the rolls and become turned in another direction. Figs. 18 and 19 illustrate stages in the passage of the uppermost cap shown in Fig. 17 as it progresses through the rolls, with Fig. 19 clearly revealing the opposite turning effect above described relative to the turning of the lower cap in Fig. 17.

The rolls 171, 172 are mounted on shafts 174, 176, and these shafts are rotatably supported in bearing members, as 178 and 179, Fig. 15. The bearing member 179 is received on a supporting frame 181, as also shown in Fig. 5. At the lower end of shaft 174 is fixed a pulley 182 driven by a belt 184 on a second pulley 186. The latter pulley is fast on a vertical shaft 188 supported in plate 166 and frame 181 and driven by bevel gears 190 and 192 operated by the gear reducer 164. On shaft 174 with pulley 182 is fixed a gear 180 which is in mesh with another gear 183 fast on the shaft 176. This arrangement provides a suitable drive for the two cap turning rolls, as will be evident from an inspection of Figs. 5, 14 and 15.

As the turned caps leave the rolls 171, 172, they pass in to an inclined conductor member 194, better shown in Figs. 17 and 19. This conductor is formed with a relatively narrow passageway 195 of a width limited so that a cap having been entered therein in a position, such as illustrated in Fig. 17, must thereafter remain in this position. It will be observed that the over-all width of the conductor member 194 has been selected of sufficient magnitude to receive caps turned in either direction about a vertical axis, as is also illustrated in Figs. 17 and 19.

The conductor member 194 has its lower edge supported at a point directly below the cap turning rolls in some convenient manner, such as that shown in Fig. 5, wherein the conductor edge is attached to the supporting framework 181.

The lower end of the conductor member tapers inwardly, as shown at the left-hand side of Fig. 14, and also extends downwardly in a somewhat curved direction, as illustrated at the left-hand side of Fig. 15. Just inside of the converging portions of the conductor are located a pair of adjustable guide arms 198, 199 which function to direct caps in to a magazine member 200 connected to the lower end of the conductor member.

The magazine 200 comprises a box-like cap retaining conduit which extends forwardly and downwardly toward the capping station of the capping apparatus. For convenience, the magazine has been illustrated in Fig. 15 as projecting forwardly in a more or less horizontal direction. It should be understood, however, that actually the magazine has a relatively sharp downward pitch, as is more clearly indicated in Fig. 5. Also, the magazine, or the cap conductor 194, or both of these members, may have a turn or twist formed therein sufficiently to locate the magazine in proper relationship to the capping apparatus, as suggested in Fig. 5.

Supported in the cap retaining conduit or magazine is a base plate 202 on which caps are caused to slide. Also, a pair of guiding side walls 206 and 208 are adjustably supported on posts 207 and 209 which are transversely movable in slotted bars 210 and 212 at the upper side of the magazine, as shown in Fig. 14. The bars 210 and 212 also carry an adjustable center guide strip 214 which has attached to its under side a guide element 216 normally adapted to lie above the top side of a cap sliding thereunder as it drops downwardly by gravity.

A novel feature included in the magazine member is a microswitch 218 mounted on the center guide strip 214 and supporting a downwardly extending arm 220. This arm normally lies in the path of movement of a cap passing through the magazine, such that when the lower end of the arm is engaged by a cap it will be lifted upwardly to actuate the switch 218 and to open a circuit controlling motor 165 (Fig. 16a) which operates the conveyor for the hopper mechanism.

The switch arrangement described is a desirable control as it eliminates a needless working together of caps, one against another, in the hopper in response to demand for caps from the capping mechanism and yet always maintaining an adequate supply. Interrupting the movement of the conveyor and its pins reduces the tendency to scratch or mar the caps from excessive stirring. Also, the control of hopper operation tends to minimize any possibility of caps becoming jammed or clogged at any point along the cap furnishing apparatus. The control operates at any time that the capping apparatus fails to remove its usual number of caps in a given time interval. It is pointed out, however, that the capping apparatus, in effect, controls the operation of the hopper in a highly useful manner.

At its forward end the magazine 200 projects downwardly in to a position just above the conveyor C, as noted in Fig. 5. The magazine occurs at a height so selected that it may support a jar cap in a pair of fingers 222 and 224, Fig. 14, in a resilient manner against a spring-loaded plunger 226 directly in the path of a jar top, as has been more fully illustrated in Fig. 20.

In the inclined position of the cap, as shown in Fig. 20, a spring-loaded presser foot 228 is pivotally mounted in a bracket 230 which is connected to a bracket 256 and is in a position to confine and bear against the upper surface of the cap, thus resiliently holding it against the thrust of a jar top passing thereunder. The front edge of the jar top engages against the inside edge of the tipped cap illustrated in Fig. 20, and gradually picks it off from the fingers 222 and 224 and moves the cap forwardly.

We are aware that various prior art machines have included means for supporting a cap in a position such that a jar top carried on a conveyor will come into engagement with the cap and remove it from the so-called "pick-off" device. However, at this particular point it is important to note, and attention is directed to the fact, that a great deal of difficulty has developed from cross-threading caps. Apparently what occurs is that every so often caps in a jar will come into contact with one another in such relationship that the lowest portion of a thread or lug on a cap comes to rest against the highest portion of a thread on a jar. This tends to cause a slight tipping of the cap. If the latter member is then quickly turned around the threads on the jar while in this position, the cap may not have an opportunity to square itself and cross-threading takes place.

We have discovered a method and means for avoiding this difficulty almost entirely, and an exceedingly important feature of our invention is a mechanism for doing this, which we refer to as a "cap levelling unit" or device. This levelling unit has been illustrated in Figs. 20 to 22, inclusive, and essentially comprises a cap guide which can pivot from a normally inclined position, suitable for receiving a cap from the pick-off station into a position such that the top of the cap occurs in true parallel relationship with respect to a horizontal plane passing through the top of the jar. Moreover, the levelling device operates to hold the cap in its levelled relation up to, and including, the point at which the cap is actually screwed on to the jar.

Referring to Figs. 20 to 22, inclusive, numerals 240, 242 and 244 refer to parts of a channel member in which a cap may be freely received in the manner indicated in Fig. 22. The under side or edge of the cap is supported on rails 246 and 248 attached at the under sides of the members 242, 244 in a position such that they extend inwardly beyond the inner surfaces of these elements to provide edges on which the cap may be slidably received. It should be understood that the size of the channel member may vary in accordance with the size of the cap which is to be guided. In practice good results have been obtained by furnishing a series of channel members which may be installed in the machine in accordance with the cap size to be handled.

The channel member shown in the drawings is pivotally supported in some convenient manner as, for example, by being welded to a plate 250 which is pivotally mounted on a pin 252 extending through a bracket 254 bolted to the under side of another bracket 256, Fig. 20. The point at which the channel member is pivoted is so selected that the left-hand end of the channel member, as viewed in Fig. 20, normally seeks to assume a slightly raised position in which it lies somewhat in alignment with a cap which is being detached from the pick-off station.

A spring-loaded plunger 258 operates to bear against a forward tongue portion 260 formed in the member 240, as is better shown in Fig. 21. A stop member 262 limits the arc of rotation of the channel member about its pivot in response to the thrust of the spring-pressed plunger 258.

It will be observed that the front ends of the rails 246 and 248 extend forwardly and are formed in the shape of relatively thin resilient fingers 264 and 266 which are of sufficient length so that they may support under edges of a cap while it is actually being screwed in to the jar J. The fingers cooperate to resiliently hold the jar in a true levelled position against the slight resilient holding force of the plunger 258 so that the cap is at all times firmly maintained in a squarely disposed position above the jar and, at the same time, is lightly pressed down against the jar, with the result that there is no opportunity for cross-threading to occur either at the time of initiating the threading operation, or at any time while it is taking place. It will be observed that both the stop member 262 and the spring-pressed plunger 258 are provided with suitable adjustment means for varying the points at which they exercise their respective functions in accordance with change in sizes of the caps to be handled.

It is pointed out that in dealing with a considerable range of jar sizes it may be necessary to adjust the position of the entire magazine levelling device and capping apparatus. We have provided means for accurately meeting this objective, comprising an elevator mechanism, particularly illustrated in Figs. 2 and 3.

As shown in these figures the entire machine body is supported on pads 10. Levelling screws 10a are rotatably received at the upper sides of each one of these pads 10. The screws are provided with nuts 10c fastened theron to permit engagement by a suitable tool and provide for rotation of the screws. The levelling screws 10a have their upper ends threaded into another set of screw members 10b which project upwardly through the bottom section of the frame, as shown in Fig. 2. The screw members 10b are provided with external threads around which are adjustably supported a plurality of sleeve members 10d. These members are welded, or otherwise solidly secured, to base plate members 10e, in turn solidly fastened to the vertical frame pieces 10f, all as shown in Fig. 2.

Fast on each of the screw members 10b are sprockets 10g driven by a chain 10h, and at the lower left-hand side of the casing is rotatably supported a worm 10i which can be turned by a crank 10j to rotate the sprocket 10g with which it is in mesh.

In using the above described adjustment apparatus the usual procedure is to place a cap in the pick-off station at the end of the magazine members 222 and 224. A jar is then placed on the conveyor C at a point directly below the cap in the members 222 and 224. Thereafter the handle 10j is rotated in a proper direction to adjust the entire capping and hopper unit so that the cap just comes into engagement with the jar at a point above the highest thread on the lip of the jar. This provides for an approximate setting of the machine. In order to ensure that the entire structure is level, the levelling screws 10a are then rotated into suitable positions at each corner of the casing to ensure a true level position on all sides.

In Figs. 32 to 34, inclusive, we have illustrated a modified form of jar-gripping side belts which are designed to provided somewhat more flexibility in adapting the device to varying sizes of jars and caps.

It will be apparent that in dealing with very shallow jars or containers, the height of which may be less than the height or width of the side belts 116, 116' above described, it will be difficult to carry out a proper gripping action, during the capping operation.

To deal with this need for a wide range of adjustability in the side gripping belts, we may provide a chain member 280 which is adapted to be driven by a gear member 282, both the chain and gear taking the place of the side belt 116 and the pulley 109, respectively, as these latter elements are shown in Fig. 8 of the drawings. Similarly, a second chain 284 in mesh with a gear 286 may be substituted in place of the side belt 116' and the pulley 109' in Fig. 8.

Along the inner edges of the chains 280 and 284 we secure gripper blocks 288 and 290, respectively, as is bettershown in Fig. 33. The gripper blocks may be received in tubular holders 292 and 294 pinned through the chain links, as shown in Fig. 33. It will be apparent that the blocks 288 and 290 may be chosen of a height or thickness which is so related to the height of a jar as to overlie a substantial part of the peripheral surface of the jar without extending above the side of the jar J in an objectionable manner. By means of this arrangement the capping rolls can be brought down in to desired engagement with the jar cap without interference with the side belt in the manner generally suggested in Fig. 33.

It will be apparent that by using gripper blocks which are detachable or replaceable on the chain member, we may accommodate a wide range of jar heights, especially very tall jars, such as the jar shown in Fig. 34, for example. In making this adjustment we may increase the gripping area of the blocks in accordance with the size of the jar itself. Thus, the blocks 300 and 302 are constructed of a much greater size than the blocks 288 and 294, and a more efficient and positive gripping action against the jar periphery may be realized as it moves along a conveyor member C'.

It is pointed out that the gripping blocks may be attached to the chain or other conveyor belt member in various other ways than that illustrated in Figs. 32 to 34 as, for example, by spring clips, screw fastenings, and the like. The gripping blocks may be composed of various substances, such as rubber, or mixtures of rubber and fiber, and similar high friction bodies.

In connection with the use of kinetic energy in a friction roll driving unit, in order to control capping in a predetermined manner, it is pointed out that the particular roll assembly above described involving the use of a pair of capping rolls and a corresponding pair of driven rolls adapted to be engaged by an impeller roll is very useful by itself without any jar feeding mechanism. For certain operations, where the output is small, it may be desired to feed jars to the cap tightening mechanism by hand.

It may also be desired to utilize the method and capping roll apparatus of the invention in modified forms, utilizing modified arrangements for supporting kinetic energy rolls as shown, for example, in Fig. 35, in which a single capping roll R is carried for rotation in a pivoted sleeve S having a single frictional driving roll F. The members F, S and R may be supported in a mounting corresponding to that employed and described for the capping roll 20. The capping roll R is adapted to engage against the cap of a jar, as shown, supported between side belts M and B and, if desired, we may employ an idler roll R' on a shaft S' which either may, or may not, be pivoted. The above described mechanism is intended to be illustrative of a capping machine in which the controlled kinetic energy principle is utilized but employing only a single driven capping roll. Various other modifications may be resorted to.

It will also be apparent that we have disclosed broadly a method of tightening together two threaded bodies, which method is not limited solely to jar capping operations. For example, the method may be employed in connection with tightening two threaded members of a projectile, as put together in ammunition plants. Also, the method may be practiced in securing together in predetermined tightening relationship threaded parts of tool assemblies. In addition, the method may be employed in assembling various threaded mechanisms of the type found in delicate instruments of the measuring variety where the threaded mechanism must be secured together with a carefully controlled degree of tightness. In this connection, as well as in the other applications of the kinetic energy tightening rolls, it is pointed out that a very delicate and desirable control of the kinetic energy tightening operation may be carried out. Thus, one may, as pointed out above, vary the size of the kinetic energy rolls to meet with a desired set of conditions. It should also be observed that it is equally possible and desirable to vary the speed of rotation of the rolls and, for some purposes, it may be preferable to use a single set of rolls and to provide means for driving these rolls in a range of speeds. Obviously control of both the size of the rolls, and their speeds, may be realized where this is desired.

It is further intended that the cap levelling unit shall be employed with various types of capping apparatus, such as are well known to the art and in use at the present time. Similarly, we may desire to employ the cap separating hopper mechanism and cap turning roll assembly with other types of capping apparatus.

From the foregoing it will be evident that the invention makes several important contributions to methods and machinery for handling jars, especially in industries where the jars are handled in substantial volume. The methods and apparatus described above effect important savings in labor, reduce floor space required to handle a given volume of material, and greatly reduce the expense of preparing materials for the market. Moreover, a relatively high speed operation is easily attainable and safe capping can be carried out.

While preferred embodiments of the invention have been described and illustrated, it will be evident that the invention is susceptible of embodiment in other forms without departing from the spirit or scope thereof.

This application is a continuation-in-part of our earlier application Ser. No. 19,676, filed April 8, 1948, for Improvements in Methods of and Machines for Capping Jars, now Patent No. 2,596,408.

We claim:

1. An improved hopper mechanism for receiving and feeding a mass of cupped bodies, comprising a hopper member formed with spaced-apart sides which slope toward one another and define a bottom guideway along which the cupped bodies are passed, a flexible conveyor running through said bottom guideway, the conveyor being provided with parts operative to select individual cupped bodies from the mass and carry them, one at a time, out of the hopper, a vertical guideway located adjacent to one extremity of the conveyor and through which cupped bodies leaving the conveyor are allowed to fall while maintained on edge, and turning roll means mounted at the bottom of the vertical guideway to engage and turn said cupped bodies about a vertical axis in to a desired feeding position, and said turning roll means including a pair of rolls constructed and arranged to receive and guide a cupped body therebetween.

2. In a jar capping mechanism, the combination of two rolls, means supporting them for simultaneous contact with opposite sides of a screw cap mounted on a jar top, power-driven mechanism for revolving said rolls in directions to cause them to revolve the cap and screw it down on said jar, said power-driven mechanism comprising additional rolls mounted above said cap engaging rolls and revolving, respectively, with the latter, a power-driven roll positioned to frictionally engage both of said additional rolls simultaneously to drive the latter, and springs holding said cap engaging rolls yieldingly into contact with said cap whereby when said cap is forced between the two rolls that revolve it, it will force the latter rolls apart and thereby interrupt the engagement of said additional rolls with the roll that drives both of them including a driving shaft for the said power-driven roll, spring means connected to the shaft, and driving connections for engaging said power-driven roll with the shaft and spring means.

3. In a jar capping mechanism, the combination of two rolls, means supporting them for simultaneous contact with opposite sides of a screw cap mounted on a jar top, power-driven mechanism for revolving said rolls in directions to cause them to revolve the cap and screw it down on said jar, said power-driven mechanism comprising additional rolls mounted above said cap engaging rolls and revolving, respectively, with the latter, a power-driven roll positioned to frictionally engage both of said additional rolls simultaneously to drive the latter, and springs holding said cap engaging rolls yieldingly into contact with said cap whereby when said cap is forced between the two rolls that revolve it, it will force the latter rolls apart and thereby interrupt the engagement of said additional rolls with the roll that drives both of them including a driving shaft for the said power-driven roll, a torque arrestor mechanism associated with the driving shaft, said torque arrestor mechanism comprising a spring having one end anchored to the shaft, and driving connections for engaging said power-driven roll with the shaft and spring means, said driving connections including a pin member rotatable about the shaft, and means for limiting the arc of rotation of the pin.

4. In a capping mechanism, the combination with a conveyor member for supporting a container thereon, of two rolls, means supporting them for simultaneous contact with opposite sides of a container cap mounted on the container, power-driven mechanism for revolving said rolls in directions to cause them to revolve the cap and tightly engage it with the container, an inclined cap furnishing mechanism mounted above the conveyor and adapted to support a cap in the path of movement of the said container as it is carried along by the conveyor, and a cap levelling guide pivotally supported between the cap furnishing mechanism and the cap engaging roll, said levelling guide having a channeled portion for locating the cap in a horizontally disposed position and said guide further being constructed and arranged to provide a pair of supporting edges for receiving the cap from the said channeled portion and maintaining it in a substantially level position as the cap moves into engagement with the cap engaging roll.

5. A machine according to claim 4, in which the cap levelling guide is pivoted about a horizontal axis, spring means for normally urging the guide into an inclined position to register with a cap as it is detached from the cap furnishing mechanism by the container, stop means for resiliently holding the guide as it moves into a levelled position when reacted on by the container.

6. In a jar capping machine having a capping station, the combination of cap delivering mechanism, comprising a hopper for supporting a loose mass of caps, a conveyor running through said hopper and provided with parts operative to pick up and arrange the caps on edge and carry them, one at a time, out of the hopper, means for feeding caps through the capping station, including a guideway for receiving the caps as they are delivered from the hopper by the said conveyor, said guideway being adapted to maintain the caps in a vertically disposed position, one above another, a pair of cap turning rolls mounted for rotation about vertical axes, said rolls presenting yieldable surfaces for engaging with a cap at the bottom of said guideway and turning it into a desired position.

7. In a capping machine, the combination with mechanism for feeding caps to the machine, or a cap receptacle for holding caps on edge, one above another, a pair of cap turning rolls having yieldable surfaces, said rolls being mounted in position to engage a cap while supported on its peripheral edge at the bottom of the cap receptacle and to turn the cap about a vertical axis, through a limited arc of rotation, and an inclined guide member constructed and arranged to receive the rotated cap as it leaves the nip of the rolls and to maintain the cap with its top in an uppermost position as it passes along the guide member.

8. A device as described in claim 7, including a cap magazine provided at the bottom of the said guide means.

9. In a capping machine, the combination with mechanism for feeding caps to the machine, of means for supporting a cap on its peripheral edge, and a pair of cap turning rolls having cooperating yieldable surfaces for resiliently engaging the cap and turning it in the direction of its open side about a vertical axis and through a limited arc of rotation, and means consisting of a curved conduit for receiving the cap in its turned position and guiding it to a capping station.

10. A device as described in claim 8, and further including guide means for receiving the cap in its turned position and guiding it along an inclined path so that its top is caused to occur in an uppermost position.

11. A feeding mechanism according to claim 10, in which the guide means comprises a cap magazine supported on the machine in an inclined position with its upper end arranged to receive caps which are rotated about a vertical axis in either of two directions.

12. In a capping machine, a mechanism for feeding caps to the machine, comprising a hopper for supporting a loose mass of caps, a conveyor running through the hopper and provided with elements operative to pick up and arrange the caps on edge and carry them, one at a time, upwardly along an inclined path, a cap receptacle located in position to receive caps delivered from the upper end of the said conveyor and to stack the caps on edge, one above another, a pair of cap turning rolls having yieldable surfaces for engaging a cap while supported on its peripheral edge at the bottom of the cap receptacle, said turning rolls being adapted to turn the caps about a vertical axis through a limited arc of rotation, and an inclined guide member constructed and arranged to receive the turned cap as it leaves the nip of the rolls and to cause it to pass along with its top in an uppermost position.

13. A feed mechanism for hollow cylindrical bodies of the type having a closed end wall and a peripheral edge portion extending therearound, said mechanism comprising a pair of turning rolls mounted for rotation about a vertical axis and having yieldable surfaces for engaging one of said cylindrical bodies while supported on its peripheral edge, and simultaneously passing the body between the nip point of the rolls and turning the body about a vertical axis through a limited arc of rotation, and guide means for receiving the cylindrical bodies while in a turned position.

14. A mechanism as described in claim 13, including means consisting of an inclined chute for feeding the said cylindrical bodies, one after another, through the said rolls.

15. In a jar capping machine, the combination of cap delivering mechanism comprising a hopper for supporting a loose mass of caps, a conveyor running through said hopper and provided with parts operative to pick up the caps and carry them, one at a time, out of the hopper, said hopper being formed in two sections lying at opposite sides of the conveyor and adjustable toward and away from one another, each of said sections having an inclined side portion for causing caps to be located on edge on the said conveyor.

16. A machine according to claim 15, in which the conveyor member is adjustable vertically with respect to the hopper.

17. In a capping machine of the class described a cap-applying mechanism including a pair of cap engaging rolls mounted for rotation about vertical axes, a cap levelling device arranged in cooperating relationship with the cap engaging rolls and comprising a horizontally disposed cap guide, said guide being formed with a channeled portion for receiving a screw cap therein, and means for locating the cap guide with the screw cap in a substantially leveled position at the point of engagement of the cap engaging rolls with the screw cap.

18. A machine according to claim 17, in which the cap guide includes a pair of resilient spaced-apart arms constructed and arranged to receive and support the bottom edge of the cap at two opposite sides thereof and at points occurring below the cap engaging rolls.

19. In a jar capping mechanism, the combination of two rolls, means supporting them for simultaneous contact with opposite sides of a screw cap mounted on a jar top, power-driven mechanism for revolving said rolls in directions to cause them to revolve the cap and screw it down on said jar, said power-driven mechanism comprising additional rolls mounted above said cap engaging rolls and revolving, respectively, with the latter, and a third power-driven roll positioned to frictionally engage both of said additional rolls simultaneously to drive the latter, a guide mechanism for conducting caps into position to be engaged by the said jar, and a feed mechanism comprising a pair of sorting rolls mounted for rotation about vertical axes, means for supporting caps on edge and guiding them while on edge between the sorting rolls, and a supporting member for receiving caps passing between the rolls and conveying the caps with their respective tops in an uppermost position relative to the said guide means.

References Cited in the file of this patent

UNITED STATES PATENTS

| | | |
|---|---|---|
| 1,406,963 | Angus | Feb. 21, 1922 |
| 1,425,374 | Elgy | Aug. 8, 1922 |
| 1,445,296 | Clark | Feb. 13, 1923 |
| 1,664,514 | Kramer | Apr. 3, 1928 |
| 1,669,087 | Hungerford | May 8, 1928 |
| 2,053,763 | Brinton | Sept. 8, 1936 |
| 2,072,245 | Cuthbert et al. | Mar. 2, 1937 |
| 2,082,048 | Everett | June 1, 1937 |
| 2,136,037 | Blackman et al. | Nov. 8, 1938 |
| 2,270,713 | Belada | Jan. 20, 1942 |
| 2,364,523 | Gantzer | Dec. 5, 1944 |
| 2,435,127 | Cameron | Jan. 27, 1948 |
| 2,596,408 | Johnson et al. | May 13, 1952 |
| 2,630,959 | Brown | Mar. 10, 1953 |
| 2,658,654 | Schweizer | Nov. 10, 1953 |